US012768572B2

(12) United States Patent
Thatte et al.

(10) Patent No.: US 12,768,572 B2
(45) Date of Patent: Oct. 20, 2026

(54) HEAT PUMP SYSTEMS WITH PRESSURE EXCHANGERS

(71) Applicant: Energy Recovery, Inc., San Leandro, CA (US)

(72) Inventors: Azam Mihir Thatte, Kensington, CA (US); Kuo-Chiang Chen, Dublin, CA (US); Farshad Ghasripoor, Berkeley, CA (US)

(73) Assignee: Energy Recovery, Inc., San Leandro, CA (US)

( * ) Notice: Subject to any disclaimer, the term of this patent is extended or adjusted under 35 U.S.C. 154(b) by 166 days.

(21) Appl. No.: 18/635,788

(22) Filed: Apr. 15, 2024

(65) Prior Publication Data

US 2024/0263846 A1 Aug. 8, 2024

Related U.S. Application Data

(62) Division of application No. 18/483,816, filed on Oct. 10, 2023, which is a division of application No. (Continued)

(51) Int. Cl.
*F03G 7/00* (2006.01)
*F25B 7/00* (2006.01)
(Continued)

(52) U.S. Cl.
CPC .................. *F25B 7/00* (2013.01); *F03G 7/00* (2013.01); *F25B 9/008* (2013.01); *F25B 13/00* (2013.01);
(Continued)

(58) Field of Classification Search
CPC ..................... F25D 17/02; Y02B 30/70; F25B 2700/21172; F25B 2400/141;
(Continued)

(56) References Cited

U.S. PATENT DOCUMENTS 2,952,138 A 9/1960 Russell et al.
2,968,435 A 1/1961 Boszormenyi et al.
(Continued)

FOREIGN PATENT DOCUMENTS

CN 1671573 A 9/2005
CN 1806151 A 7/2006
(Continued)

OTHER PUBLICATIONS

Extended European Search Report for European Application No. 22820980.5, mailed May 8, 2024, 05 Pages.
(Continued)

*Primary Examiner* — Ana M Vazquez
(74) *Attorney, Agent, or Firm* — Lowenstein Sandler LLP

(57) ABSTRACT

A system includes a pressure exchanger (PX) to receive a first fluid at a first pressure, second fluid at a second pressure, and exchange pressure between the first fluid and the second fluid. The first fluid is to exit the PX at a third pressure and the second fluid is to exit the PX at a fourth pressure. A first condenser is to receive the first fluid from a compressor and provide thermal energy from the first fluid to a first environment. A second condenser is to receive the second fluid from the PX and provide thermal energy from the second fluid to a second environment. A heat exchanger is to receive the first fluid from the first condenser and the second fluid from the second condenser, provide thermal energy from the first fluid to the second fluid, and provide the first fluid to the PX.

20 Claims, 14 Drawing Sheets

Related U.S. Application Data

17/834,834, filed on Jun. 7, 2022, now Pat. No. 12,007,154.

(60) Provisional application No. 63/287,831, filed on Dec. 9, 2021, provisional application No. 63/285,811, filed on Dec. 3, 2021, provisional application No. 63/278,804, filed on Nov. 12, 2021, provisional application No. 63/208,925, filed on Jun. 9, 2021.

(51) Int. Cl.

| | |
|---|---|
| ***F25B 9/00*** | (2006.01) |
| ***F25B 13/00*** | (2006.01) |
| ***F25B 30/02*** | (2006.01) |
| ***F25B 39/00*** | (2006.01) |
| ***F25B 39/04*** | (2006.01) |
| ***F25B 41/20*** | (2021.01) |
| ***F25B 49/02*** | (2006.01) |

(52) U.S. Cl.

CPC .............. *F25B 30/02* (2013.01); *F25B 39/00* (2013.01); *F25B 39/04* (2013.01); *F25B 41/20* (2021.01); *F25B 49/02* (2013.01); *F25B 49/022* (2013.01); *F25B 2600/025* (2013.01); *F25B 2600/13* (2013.01); *F25B 2700/13* (2013.01); *F25B 2700/151* (2013.01); *F25B 2700/1933* (2013.01); *F25B 2700/195* (2013.01); *F25B 2700/21152* (2013.01); *F25B 2700/21173* (2013.01)

(58) Field of Classification Search

CPC ............ F25B 2400/14; F25B 2309/061; F25B 2700/1931; F25B 2400/0751; F25B 2400/23; F25B 2400/05; F25B 41/00; F25B 11/02; F04F 13/00

See application file for complete search history.

(56) References Cited

U.S. PATENT DOCUMENTS

| | | | |
|---|---|---|---|
| 2,971,343 A | 2/1961 | Spalding | |
| 3,072,318 A | 1/1963 | Berger et al. | |
| 3,158,007 A | 11/1964 | Kentfield | |
| 3,347,059 A | 10/1967 | Laing | |
| 3,503,207 A | 3/1970 | Strub | |
| 3,696,634 A | 10/1972 | Ludin et al. | |
| 3,740,966 A | 6/1973 | Pravda | |
| 3,823,573 A | 7/1974 | Cassady | |
| 3,854,301 A | 12/1974 | Cytryn | |
| 3,986,852 A | 10/1976 | Doerner et al. | |
| 3,988,901 A | 11/1976 | Shelton et al. | |
| 4,000,778 A | 1/1977 | Laing | |
| 4,006,602 A | 2/1977 | Fanberg | |
| 4,015,888 A | 4/1977 | Draper et al. | |
| 4,051,888 A | 10/1977 | Yamada et al. | |
| 4,442,677 A | 4/1984 | Kauffman | |
| 4,512,394 A | 4/1985 | Kauffman | |
| 4,524,587 A | 6/1985 | Kantor | |
| 4,823,560 A | 4/1989 | Rowley et al. | |
| 4,887,942 A | 12/1989 | Hauge | |
| 5,136,854 A * | 8/1992 | Abdelmalek | F25B 11/02 62/238.4 |
| 5,284,013 A | 2/1994 | Keller | |
| 5,336,059 A | 8/1994 | Rowley | |
| 5,503,222 A | 4/1996 | Dunne | |
| 5,647,221 A | 7/1997 | Garris, Jr. | |
| 5,802,870 A | 9/1998 | Arnold et al. | |
| 5,894,719 A | 4/1999 | Nalim et al. | |
| 6,158,237 A | 12/2000 | Riffat et al. | |
| 6,178,767 B1 | 1/2001 | Pravda | |
| 6,250,086 B1 | 6/2001 | Cho et al. | |
| 6,389,818 B2 | 5/2002 | Cho et al. | |
| 6,484,519 B1 | 11/2002 | Hesse et al. | |
| 6,773,226 B2 | 8/2004 | Al-Hawaj | |
| 7,207,186 B2 | 4/2007 | Hirota | |
| 7,661,932 B2 | 2/2010 | El-Sayed et al. | |
| 7,799,221 B1 | 9/2010 | Macharg | |
| 8,075,281 B2 | 12/2011 | Martin et al. | |
| 9,243,850 B1 | 1/2016 | Bastian et al. | |
| 9,388,817 B1 | 7/2016 | Wright et al. | |
| 9,659,795 B2 | 5/2017 | Okada et al. | |
| 9,695,795 B2 | 7/2017 | Martin et al. | |
| 9,897,336 B2 | 2/2018 | Staffend et al. | |
| 9,920,774 B2 | 3/2018 | Ghasripoor et al. | |
| 10,041,701 B1 | 8/2018 | Koplow et al. | |
| 10,119,379 B2 | 11/2018 | Richter et al. | |
| 10,167,710 B2 | 1/2019 | Ghasripoor et al. | |
| 10,359,075 B2 | 7/2019 | Anderson et al. | |
| 10,557,482 B2 | 2/2020 | Anderson | |
| 10,766,009 B2 | 9/2020 | Oklejas, Jr. | |
| 10,933,375 B1 | 3/2021 | Oklejas, Jr. et al. | |
| 10,989,021 B1 | 4/2021 | Stephenson | |
| 11,073,169 B2 | 7/2021 | Thatte | |
| 11,421,918 B2 | 8/2022 | Thatte | |
| 11,692,743 B2 | 7/2023 | Thatte et al. | |
| 12,392,528 B2 | 8/2025 | Thatte et al. | |
| 2001/0020366 A1 | 9/2001 | Cho et al. | |
| 2002/0025264 A1 | 2/2002 | Polizos et al. | |
| 2003/0070634 A1 | 4/2003 | Al Hawaj | |
| 2004/0052639 A1 | 3/2004 | Al Hawaj | |
| 2004/0250556 A1 | 12/2004 | Sienel | |
| 2005/0006317 A1 | 1/2005 | Lee et al. | |
| 2005/0044865 A1 | 3/2005 | Manole | |
| 2005/0132729 A1 | 6/2005 | Manole | |
| 2005/0274132 A1 | 12/2005 | Ohta | |
| 2006/0032808 A1 | 2/2006 | Hauge | |
| 2006/0130495 A1 | 6/2006 | Dieckmann et al. | |
| 2006/0239831 A1 | 10/2006 | Garris | |
| 2006/0245909 A1 | 11/2006 | Stover | |
| 2006/0254308 A1 | 11/2006 | Yokoyama et al. | |
| 2007/0137170 A1 | 6/2007 | Bross et al. | |
| 2008/0078192 A1 | 4/2008 | Ignatiev et al. | |
| 2009/0301109 A1 | 12/2009 | Manole | |
| 2010/0024421 A1 | 2/2010 | Litwin et al. | |
| 2010/0083678 A1 | 4/2010 | Lifson et al. | |
| 2011/0051880 A1 | 3/2011 | Al-Mayahi et al. | |
| 2012/0167601 A1 | 7/2012 | Cogswell et al. | |
| 2013/0145759 A1 | 6/2013 | Sonwane et al. | |
| 2013/0280038 A1 | 10/2013 | Martin et al. | |
| 2014/0048143 A1 | 2/2014 | Lehner et al. | |
| 2014/0128656 A1 | 5/2014 | Arluck et al. | |
| 2014/0260415 A1 | 9/2014 | Ducote, Jr. et al. | |
| 2014/0326018 A1 | 11/2014 | Ignatiev | |
| 2015/0096739 A1 | 4/2015 | Ghasripoor et al. | |
| 2015/0184492 A1 | 7/2015 | Ghasripoor et al. | |
| 2015/0184502 A1 | 7/2015 | Krish et al. | |
| 2015/0184678 A1 | 7/2015 | Arluck et al. | |
| 2015/0217622 A1 | 8/2015 | Enomoto et al. | |
| 2015/0226466 A1 | 8/2015 | Cupps et al. | |
| 2015/0285101 A1 | 10/2015 | Hikichi et al. | |
| 2015/0292310 A1 | 10/2015 | Ghasripoor et al. | |
| 2016/0032691 A1 | 2/2016 | Richter et al. | |
| 2016/0047361 A1 | 2/2016 | Al-Sulaiman | |
| 2016/0062370 A1 | 3/2016 | Gaines-Germain et al. | |
| 2016/0076821 A1 | 3/2016 | Kopko | |
| 2016/0090995 A1 | 3/2016 | Yamada et al. | |
| 2016/0138649 A1 | 5/2016 | Anderson et al. | |
| 2016/0138815 A1 | 5/2016 | Swett | |
| 2016/0160849 A1 | 6/2016 | Gains-Germain et al. | |
| 2016/0160888 A1 | 6/2016 | Morphew | |
| 2016/0160889 A1 | 6/2016 | Hoffman et al. | |
| 2016/0252289 A1 | 9/2016 | Feng et al. | |
| 2016/0298500 A1 | 10/2016 | Peter et al. | |
| 2016/0377303 A1 | 12/2016 | Staffend et al. | |
| 2017/0248347 A1 | 8/2017 | Miller | |
| 2017/0335668 A1 | 11/2017 | Ghasripoor et al. | |
| 2017/0350428 A1 | 12/2017 | Martin et al. | |
| 2017/0356470 A1 | 12/2017 | Jaffrey | |
| 2018/0087364 A1 | 3/2018 | Krish et al. | |
| 2018/0094648 A1 | 4/2018 | Hoffman et al. | |
| 2018/0097246 A1 | 4/2018 | Meder | |

(56) References Cited

U.S. PATENT DOCUMENTS

| | | | |
|---|---|---|---|
| 2018/0347601 | A1 | 12/2018 | Hoffman et al. |
| 2019/0145237 | A1 | 5/2019 | Shampine |
| 2019/0153903 | A1 | 5/2019 | Miller et al. |
| 2019/0271331 | A1 | 9/2019 | Shampine |
| 2019/0390576 | A1 | 12/2019 | Thatte |
| 2020/0191445 | A1 | 6/2020 | Liu et al. |
| 2021/0123551 | A1 | 4/2021 | Kuhn De Chizelle et al. |
| 2021/0246910 | A1 | 8/2021 | Hauge |
| 2022/0011022 | A1 | 1/2022 | Thatte |
| 2022/0011023 | A1 | 1/2022 | Thatte et al. |
| 2022/0307733 | A1 | 9/2022 | Thatte et al. |
| 2022/0381496 | A1 | 12/2022 | Thatte |
| 2022/0397310 | A1 | 12/2022 | Thatte et al. |
| 2022/0397317 | A1 | 12/2022 | Thatte et al. |
| 2022/0397324 | A1 | 12/2022 | Thatte et al. |

FOREIGN PATENT DOCUMENTS

| | | | |
|---|---|---|---|
| CN | 101290174 | A | 10/2008 |
| CN | 101440828 | A | 5/2009 |
| CN | 101458000 | A | 6/2009 |
| CN | 101505961 | A | 8/2009 |
| CN | 101506596 | A | 8/2009 |
| CN | 102232167 | A | 11/2011 |
| CN | 104797897 | A | 7/2015 |
| CN | 105180513 | A | 12/2015 |
| CN | 205858491 | U | 1/2017 |
| CN | 107923416 | A | 4/2018 |
| CN | 108626902 | A | 10/2018 |
| CN | 107076055 | B | 11/2018 |
| CN | 107923416 | B | 6/2019 |
| CN | 110094907 | A | 8/2019 |
| EP | 2035758 | B1 | 7/2010 |
| EP | 2244037 | A1 | 10/2010 |
| EP | 2995885 | A1 | 3/2016 |
| EP | 2076678 | B1 | 7/2018 |
| EP | 3489595 | A1 | 5/2019 |
| EP | 3865786 | A1 | 8/2021 |
| EP | 3872418 | A1 | 9/2021 |
| EP | 3814610 | B1 | 4/2024 |
| GB | 823689 | A | 11/1959 |
| JP | H04340062 | A | 11/1992 |
| JP | 2000234814 | A | 8/2000 |
| JP | 2004028573 | A | 1/2004 |
| JP | 2005114270 | A | 4/2005 |
| JP | 2010525293 | A | 7/2010 |
| KR | 20040106766 | A | 12/2004 |
| KR | 20190133595 | A | 12/2019 |
| WO | 8805133 | A1 | 7/1988 |
| WO | 9617176 | A1 | 6/1996 |
| WO | 9917028 | A1 | 4/1999 |
| WO | 2005019743 | A1 | 3/2005 |
| WO | 2007102978 | A1 | 9/2007 |
| WO | 2008000793 | A1 | 1/2008 |
| WO | 2008019689 | A2 | 2/2008 |
| WO | 2008019689 | A3 | 4/2008 |
| WO | 2008042693 | A1 | 4/2008 |
| WO | 2008050654 | A1 | 5/2008 |
| WO | 2008150434 | A1 | 12/2008 |
| WO | 2009147826 | A1 | 12/2009 |
| WO | 2010039682 | A2 | 4/2010 |
| WO | 2011092705 | A2 | 8/2011 |
| WO | 2012042698 | A1 | 4/2012 |
| WO | 2013160953 | A1 | 10/2013 |
| WO | 2016186572 | A1 | 11/2016 |
| WO | 2017125251 | A1 | 7/2017 |
| WO | 2018092464 | A1 | 5/2018 |
| WO | 2020025770 | A2 | 2/2020 |
| WO | 2022010750 | A1 | 1/2022 |

OTHER PUBLICATIONS

"Ammonia (R-717) Vs. C02 (R-744) Refrigeration Systems," Discovery Designs Refrigeration LLC., Feb. 7, 2020, 4 Pages, Retrieved From 2, 3/(2), 4/3/(2), XP055899239, [Retrieved on Mar. 9, 2022] Retrieved from URL: https://web.archive.org/web/20200207080147/http://www.ddref.com/RefrigerantSystems/ProsVsCans.

Chinese search report for Application No. 202280006217.6, mailed Aug. 25, 2023, 11 Pages.

Extended European Search Report for European Application No. EP21837510.3, mailed Feb. 19, 2024, 10 Pages.

Fricke B. A., et al., "Increasing the Efficiency of a Carbon Dioxide Refrigeration System Using a Pressure Exchanger," Osti GOV, Aug. 1, 2019, 7 Pages.

International Search Report and Written Opinion for International Application No. PCT/US2019/039334, mailed Jan. 7, 2020, 15 Pages.

International Search Report and Written Opinion for International Application No. PCT/US2021/040199, mailed Nov. 3, 2021, 16 Pages.

International Search Report and Written Opinion for International Application No. PCT/US2021/040201, mailed Oct. 6, 2021, 30 Pages.

International Search Report and Written Opinion for International Application No. PCT/US2022/032709, mailed Sep. 8, 2022, 7 Pages.

International Search Report and Written Opinion for International Application No. PCT/US2022/032714, mailed Nov. 15, 2022, 28 Pages.

International Search Report and Written Opinion for International Application No. PCT/US2022/032722, mailed Nov. 4, 2022, 28 Pages.

International Search Report and Written Opinion for International Application No. PCT/US2023/082581, mailed Mar. 19, 2024, 15 Pages.

Kerpicci, "A Cooling Device," Full Document, 2007, pp. 1-5.

Office Action for Chinese Patent Application No. 202280006194.9, mailed Sep. 20, 2023, 11 Pages.

Office Action for Chinese Patent Application No. CN202280006018.5, mailed Jan. 12, 2024, 09 Pages.

Office Action for Danish Patent Application No. DK202370545, mailed Feb. 13, 2024, 9 Pages.

Office Action for Denmark Patent Application No. PA202370623, mailed Mar. 5, 2024, 10 Pages.

Search Report received for Danish Patent Office for Application No. 202170359, dated May 4, 2022, 11 Pages.

Search Report received for the Danish Patent Office for Application No. 202170360, dated May 4, 2022, 9 Pages.

Extended European Search Report for European Application No. 24151511.3, mailed Apr. 29, 2024, 08 Pages.

Extended European Search Report for European Application No. 24151534.5, mailed Apr. 29, 2024, 08 Pages.

Extended European Search Report for European Application No. 24151549.3, mailed Apr. 29, 2024, 08 Pages.

Extended European Search Report for European Application No. 24151569.1, mailed Apr. 29, 2024, 09 Pages.

Extended European Search Report for European Application No. 24154723.1, mailed May 28, 2024, 08 Pages.

Thatte A., "A New Type of Rotary Liquid Piston Pump for Multi-Phase CO2 Compression," Proceeding of ASME Turbo Expo 2018, Turbomachinery Technical Conference and Exposition, Jun. 11-15, 2018, Oslo Norway [GT2018-77011], 13 Pages.

Extended European Search Report for European Application No. 22820988 mailed Aug. 16, 2024 08 Pages.

Office Action for Chinese Patent Application No. 202310660629.8, mailed Sep. 26, 2024, 20 Pages.

Extended European Search Report for European Application No. EP21838787.6, mailed Nov. 8, 2024, 8 Pages.

Extended European Search Report for European Application No. 25196095.1, mailed Dec. 15, 2025, 8 Pages.

Office Action for Chinese Patent Application No. 202310660605.2, mailed Mar. 30, 2026, 20 Pages.

Office Action for Japanese Patent Application No. 2025533179, mailed Feb. 17, 2026, 06 Pages.

* cited by examiner

HEAT PUMP SYSTEMS WITH PRESSURE EXCHANGERS

RELATED APPLICATION

This application is a divisional of U.S. Non-provisional application Ser. No. 18/483,816, file Oct. 10, 2023 which is a divisional of U.S. Non-provisional application Ser. No. 17/834,834, filed Jun. 7, 2022 which claims the benefit of U.S. Provisional Application No. 63/208,925, filed Jun. 9, 2021, U.S. Provisional Application No. 63/278,804, filed Nov. 12, 2021, U.S. Provisional Application No. 63/285,811, filed Dec. 3, 2021, and U.S. Provisional Application No. 63/287,831, filed Dec. 9, 2021, the contents of which are hereby incorporated by reference in their entirety.

TECHNICAL FIELD

The present disclosure relates to systems, and, more particularly, heat pump systems with pressure exchangers.

BACKGROUND

Systems use fluids at different pressures. Systems use pumps or compressors to increase pressure of fluid.

BRIEF DESCRIPTION OF THE DRAWINGS

The present disclosure is illustrated by way of example, and not by way of limitation in the figures of the accompanying drawings.

DETAILED DESCRIPTION OF EMBODIMENTS

Figure 1A:
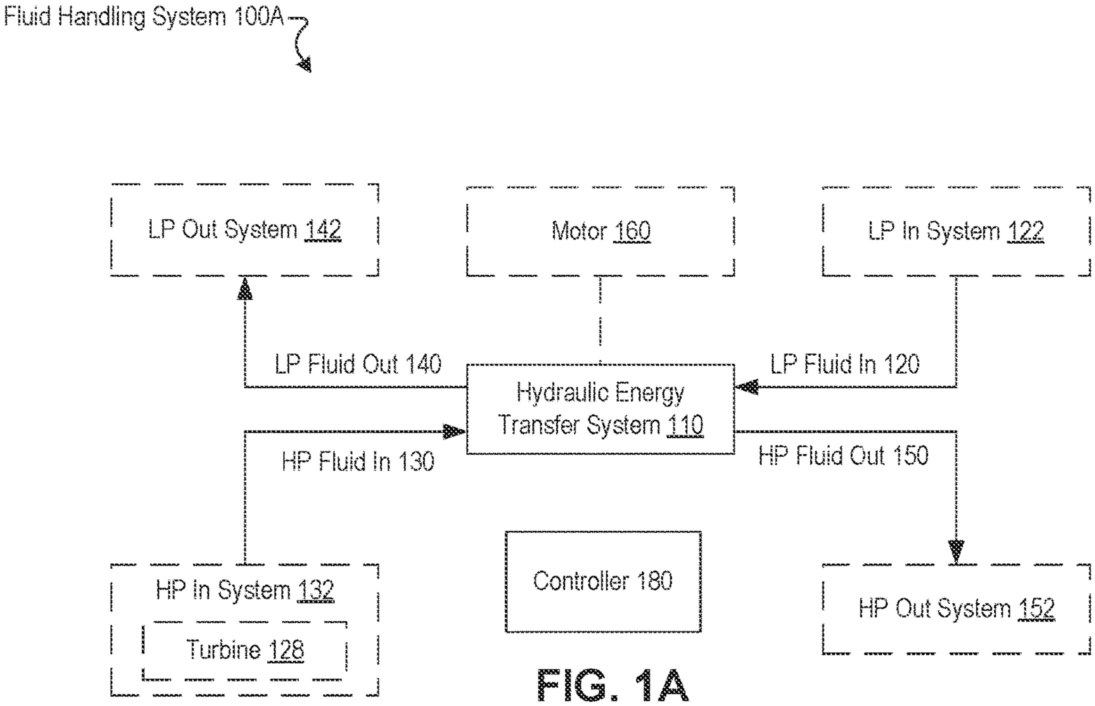
FIGS. 1A-B illustrate schematic diagrams of fluid handling systems including hydraulic energy transfer systems, according to certain embodiments.

Embodiments described herein are related to heat pump systems that include pressure exchangers (e.g., heat pump systems, refrigeration systems, pressure exchanger systems, fluid handling systems that include a pressure exchanger, heat transfer systems, carbon dioxide ($CO_2$) heat pump systems, etc.).

Systems may use fluids at different pressures. These systems may include hydraulic fracturing (e.g., fracking or fracing) systems, desalinization systems, refrigeration systems, heat pump systems, energy generation systems, mud pumping systems, slurry pumping systems, industrial fluid systems, waste fluid systems, fluid transportation systems, etc. Pumps or compressors may be used to increase pressure of fluid to be used by systems.

Conventionally, heat pump systems use pumps or compressors to increase the pressure of a fluid (e.g., a refrigeration fluid such as $CO_2$, R-744, R-134a, hydrocarbons, hydrofluorocarbons (HFCs), hydrochlorofluorocarbons (HCFCs), ammonia ($NH_3$), refrigerant blends, R-407A, R404A, etc.). Conventionally, separate pumps or compressors mechanically coupled to motors are used to increase pressure of the fluid. Pumps and compressors that operate over a large pressure differential (e.g., cause a large pressure increase in the fluid) use large quantities of energy. Conventional systems thus expend large amounts of energy increasing the pressure of the fluid (via the pumps or compressors driven by the motors). The large quantities of energy used may greatly contribute to the expenses involved in operating conventional heat pump systems. Additionally, conventional heat pump systems decrease the pressure of the fluid through expansion valves and/or heat exchangers (e.g., condensers, gas coolers, and/or evaporators, etc.). Conventional systems inefficiently increase pressure of fluid and decrease pressure of the fluid. This is wasteful in terms of energy used to run the conventional systems (e.g., energy used to repeatedly increase the pressure of the refrigeration fluid to cause increase or decrease of temperature of the surrounding environment).

Turbines are often used to recuperate thermal energy created in energy cycles. In some examples, turbines are commonly used in industrial processes where waste heat is produced. A turbine can be used to convert the waste heat (e.g., thermal energy) into useful kinetic energy. Turbines can be used to convert thermal energy into kinetic energy (e.g., rotational kinetic energy). Often, turbines are used to turn electrical generators. Conventionally, where turbines are used to generate power (e.g., via a generator mechanically coupled to the turbine), fuels such as coal or oil are consumed to produce heat required to spin the turbine. The consumption (e.g., burning) of these conventional fuels may lead to harmful emissions if proper precautions are not implemented.

The systems, devices, and methods of the present disclosure provide fluid handling systems (e.g., for heat pumping, for refrigeration, for heating, etc.). In some embodiments, a system (e.g., fluid handling system, heat pump system, refrigeration system, heat transfer system, $CO_2$ heat pump system, etc.) includes a pressure exchanger (PX) that is configured to exchange pressure between a first fluid (e.g., a high pressure portion of the refrigeration fluid in a heat pump cycle) and a second fluid (e.g., a low pressure portion of the refrigeration fluid in the heat pump cycle). In some embodiments, the PX may receive a first fluid (e.g., a portion of the refrigeration fluid at high pressure) at a first pressure via a first inlet (e.g., a high pressure inlet) and a second fluid (e.g., a portion of the refrigeration fluid at a low pressure) at a second pressure via a second inlet (e.g., a low pressure inlet). The PX may exchange pressure between the first fluid and the second fluid. The first fluid may exit the PX at a third pressure via a first outlet (e.g., a low pressure outlet) and the second fluid may exit the PX at a fourth pressure via a second outlet (e.g., a high pressure outlet). The first pressure may be higher than the second pressure, and the third pressure may be lower than the fourth pressure.

In some embodiments, the system further includes a heat exchanger (e.g., a gas cooler, a condenser, a condensing unit (CU), an air conditioning condenser, etc.) configured to provide the first fluid to the PX (e.g., via the first inlet of the PX) and transfer corresponding thermal energy (e.g., heat) between the first fluid and a third fluid (e.g., a power cycle fluid as explained herein) and/or an environment (e.g., a heat sink, a hot reservoir, etc.). In some embodiments, the first fluid (e.g., the high pressure fluid) loses heat to the third fluid (e.g., via the heat exchanger) and cools (e.g., condenses) in the heat exchanger. The heat exchanger may provide the high pressure first fluid to the high pressure inlet (e.g., the first inlet) of the PX. The heat exchanger may be disposed upstream of the PX on a flow path of the first fluid. In some embodiments, the heat exchanger (or another heat exchanger) provides thermal energy from the first fluid to a corresponding environment. The heat exchanger may both heat the third fluid and heat the corresponding environment by providing thermal energy from the first fluid.

In some embodiments, the pressure exchanger system further includes a turbine. The turbine may receive the third fluid from the heat exchanger (e.g., at a heightened temperature). The turbine may convert corresponding thermal energy of the third fluid into kinetic energy (e.g., rotational kinetic energy). In some embodiments, the turbine drives a generator that can be used to generate electricity. In some embodiments, the electricity generated can be used to offset power consumed by one or more electric motors used to operate the system (e.g., electric motors used to drive one or more compressors or pumps, etc.).

The system may further include one or more of an expansion valve, another heat exchanger (e.g., an evaporator), and a compressor (e.g., at least the expansion valve, gas cooler, evaporator, and compressor may be used to perform a heat pump cycle). At least a portion of the first fluid may expand through the expansion valve, decreasing in pressure and temperature. Thermal energy (e.g., heat) may be provided to the first fluid from an environment (e.g., ambient air, the ground, a heat source, a cold reservoir, etc.) via the evaporator. The first fluid may be compressed in a compressor to increase pressure of the first fluid. Thermal energy may be rejected from the first fluid to the third fluid in the gas cooler, and the first fluid may flow into the PX and exchange pressure with the second fluid as part of a heat pump cycle.

In some embodiments, a system includes a PX and a condenser. The system may further include a heat exchanger (e.g., a sub-cooler) to receive the first fluid output from the condenser. The heat exchanger may also receive fluid to be input to a compressor. The heat exchanger may provide corresponding thermal energy (e.g., heat) from the first fluid to the fluid to be input to the compressor. The system may further include a pump to receive the first fluid from the heat exchanger and increase pressure of the first fluid. The pump may provide the first fluid to the PX.

In some embodiments, a system includes a PX, a first condenser (e.g., a primary or main condenser), and a second condenser (e.g., an auxiliary condenser). The first condenser may be configured to receive the first fluid output from a compressor and provide corresponding thermal energy (e.g., heat) from the first fluid to an environment. The second condenser may be configured to receive the second fluid from the PX and provide corresponding thermal energy (e.g., heat) from the second fluid to an environment. In some embodiments, the environment associated with the second condenser is the same environment associated with the first condenser. However, in some embodiments, the environment associated with the second condenser is a different environment than the environment associated with the first condenser. The system may further include a heat exchanger configured to receive the first fluid output from the first condenser and further configured to receive the second fluid output from the second condenser. The heat exchanger may be configured to provide corresponding thermal energy from the first fluid to the second fluid to cool the first fluid. The heat exchanger may be further configured to provide the first fluid to the PX.

The systems, devices, and methods of the present disclosure have advantages over conventional solutions. The present disclosure may use a reduced amount of energy (e.g., uses less energy to run a heat pump or refrigeration cycle) compared to conventional systems. Additionally, in some embodiments, the systems of the present disclosure may produce power as a byproduct of the heat pump system, thus decreasing power needs of the system even more. In some examples, the power generated by the heat pump system can be used by the system to at least partially power the system (e.g., the power can be used by motor(s) coupled to pumps, compressors, the PX, etc.). This causes systems of the present disclosure to have increased efficiency compared to conventional systems and thus using less energy and costing less to operate over time to the end-user compared to conventional solutions. Additionally, the present disclosure reduces wear on components (e.g., pumps, compressors) compared to conventional systems because the pumps or compressors of the system are run more efficiently compared to conventional systems (e.g., the PX performs a portion of the increasing of pressure of the fluid to decrease the load of the pumps and/or compressor). This also allows the present disclosure to have increased reliability, less maintenance, increased service life of components, decreased downtime of the system, and increased yield (e.g., of heat pumping, heating, cooling, etc.). The systems of the present disclosure may use a pressure exchanger that allows for longer life of components of the system, that increases system efficiency, allows end users to select from a larger range of pumps and/or compressors, reduces maintenance and downtime to service pumps and/or compressors, and allows for new instrumentation and control devices.

Although some embodiments of the present disclosure are described in relation to pressure exchangers, energy recovery devices, and hydraulic energy transfer systems, the current disclosure can be applied to other systems and devices (e.g., pressure exchanger that is not isobaric, rotating components that are not a pressure exchanger, a pressure exchanger that is not rotary, systems that do not include pressure exchangers, etc.).

Although some embodiments of the present disclosure are described in relation to exchanging pressure between fluid used in fracing systems, desalinization systems, heat pump systems, and/or refrigeration systems, the present disclosure can be applied to other types of systems. Fluids can refer to liquid, gas, transcritical fluid, supercritical fluid, subcritical fluid, and/or combinations thereof.

Although some embodiments of the present disclosure are described in relation to particle-laden fluid and substantially particle-free fluid, the present disclosure can be applied to other types of fluids, such as higher velocity fluid and lower velocity fluid, fluid that has more than a threshold amount of certain chemicals and fluid that has less than the threshold amount of certain chemicals, etc.

FIG. 1A illustrates a schematic diagram of a fluid handling system 100A that includes a hydraulic energy transfer system 110, according to certain embodiments.

In some embodiments, a hydraulic energy transfer system 110 includes a pressure exchanger (e.g., PX). The hydraulic energy transfer system 110 (e.g., PX) receives low pressure (LP) fluid in 120 (e.g., via a low-pressure inlet) from an LP in system 122. The hydraulic energy transfer system 110 also receives high pressure (HP) fluid in 130 (e.g., via a high-pressure inlet) from HP in system 132. In some embodiments, HP in system 132 includes a turbine 128 (e.g., as part of a power cycle) to recover thermal energy and convert the thermal energy into kinetic energy. The hydraulic energy transfer system 110 (e.g., PX) exchanges pressure between the HP fluid in 130 and the LP fluid in 120 to provide LP fluid out 140 (e.g., via low-pressure outlet) to LP fluid out system 142 and to provide HP fluid out 150 (e.g., via high-pressure outlet) to HP fluid out system 152. A controller 180 may cause an adjustment of flowrates of HP fluid in 130 and LP fluid out 140 by one or more flow valves, pumps, and/or compressors (not illustrated). The controller 180 may cause flow valves and/or expansion valves to actuate.

In some embodiments, the hydraulic energy transfer system 110 includes a PX to exchange pressure between the HP fluid in 130 and the LP fluid in 120. In some embodiments, the PX is substantially or partially isobaric (e.g., an isobaric pressure exchanger (IPX)). The PX may be a device that transfers fluid pressure between HP fluid in 130 and LP fluid in 120 at efficiencies (e.g., pressure transfer efficiencies, substantially isobaric) in excess of approximately 50%, 60%, 70%, 80%, 90%, or greater (e.g., without utilizing centrifugal technology). High pressure (e.g., HP fluid in 130, HP fluid out 150) refers to pressures greater than the low pressure (e.g., LP fluid in 120, LP fluid out 140). LP fluid in 120 of the PX may be pressurized and exit the PX at high pressure (e.g., HP fluid out 150, at a pressure greater than that of LP fluid in 120), and HP fluid in 130 may be at least partially depressurized and exit the PX at low pressure (e.g., LP fluid out 140, at a pressure less than that of the HP fluid in 130). The PX may operate with the HP fluid in 130 directly applying a force to pressurize the LP fluid in 120, with or without a fluid separator between the fluids. Examples of fluid separators that may be used with the PX include, but are not limited to, pistons, bladders, diaphragms, and/or the like. In some embodiments, PXs may be rotary devices. Rotary PXs, such as those manufactured by Energy Recovery, Inc. of San Leandro, Calif., may not have any separate valves, since the effective valving action is accomplished internal to the device via the relative motion of a rotor with respect to end covers. In some embodiments, rotary PXs operate with internal pistons to isolate fluids and transfer pressure with relatively little mixing of the inlet fluid streams. In some embodiments, rotary PXs operate without internal pistons between the fluids. Reciprocating PXs may include a piston moving back and forth in a cylinder for transferring pressure between the fluid streams. Any PX or multiple PXs may be used in the present disclosure, such as, but not limited to, rotary PXs, reciprocating PXs, or any combination thereof. In addition, the PX may be disposed on a skid separate from the other components of a fluid handling system 100A (e.g., in situations in which the PX is added to an existing fluid handling system). In some examples, the PX may be fastened to a structure that can be moved from one site to another. The PX may be coupled to a system (e.g., pipes of a system, etc.) that has been built on-site. The structure to which the PX is fastened may be referred to as a 'skid.'

In some embodiments, a motor 160 is coupled to hydraulic energy transfer system 110 (e.g., to a PX). In some embodiments, the motor 160 controls the speed of a rotor of the hydraulic energy transfer system 110 (e.g., to increase pressure of HP fluid out 150, to decrease pressure of HP fluid out 150, etc.). In some embodiments, motor 160 generates energy (e.g., acts as a generator) based on pressure exchanging in hydraulic energy transfer system 110.

The hydraulic energy transfer system 110 may include a hydraulic turbocharger or hydraulic pressure exchanger, such as a rotating PX. The PX may include one or more chambers (e.g., 1 to 100) to facilitate pressure transfer between first and second fluids (e.g., gas, liquid, multi-phase fluid). In some embodiments, the PX may transfer pressure between a first fluid (e.g., pressure exchange fluid, such as a proppant free fluid, substantially proppant free fluid, lower viscosity fluid, fluid that has lower than a threshold amount of certain chemicals, etc.) and a second fluid that may have a higher viscosity (e.g., be highly viscous), include more than a threshold amount of certain chemicals, and/or contain solid particles (e.g., frac fluid and/or fluid containing sand, proppant, powders, debris, ceramics, contaminants, particles from welded or soldered joints, etc.).

In some embodiments, LP in system 122 includes a booster (e.g., a pump and/or a compressor) to increase pressure of fluid to form LP fluid in 120. In some embodiments, LP in system 122 receives a gas from LP out system 142. In some embodiments, LP in system 122 receives fluid from receiver. The receiver may receive LP fluid out 140 output from hydraulic energy transfer system 110.

Fluid handling system 100A may additionally include one or more sensors to provide sensor data (e.g., flowrate data, pressure data, velocity data, etc.) associated with the fluids of fluid handling system 100A. Controller 180 may control one or more flow rates of fluid handling system 100A based on the sensor data. In some embodiments, controller 180 causes one or more flow valves to actuate based on sensor data received. In some embodiments, the controller 180 can perform the methods of one or more of FIGS. 6A-C.

One or more components of the hydraulic energy transfer system 110 may be used in different types of systems, such as fracing systems, desalination systems, refrigeration and heat pump systems, slurry pumping systems, industrial fluid systems, waste fluid systems, fluid transportation systems, heat transfer systems, etc.

Figure 1B:
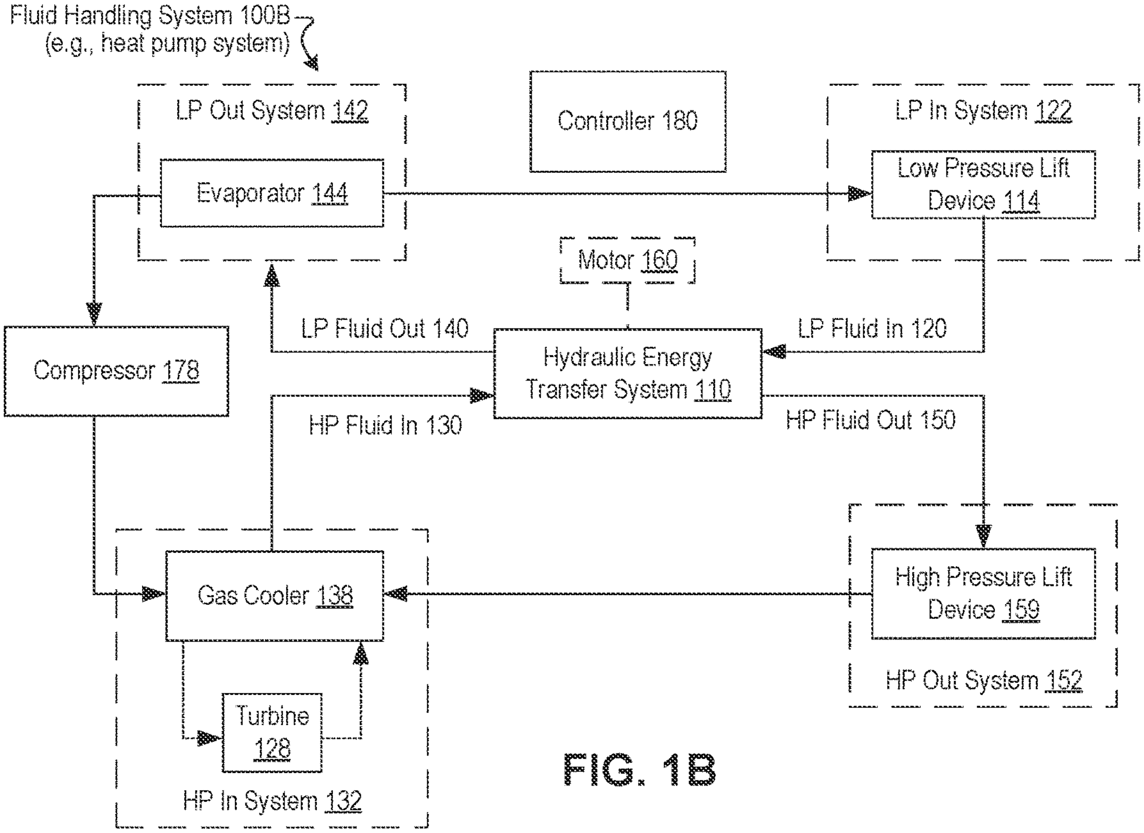

FIG. 1B illustrates a schematic diagram of a fluid handling system 100B including a hydraulic energy transfer system 110, according to certain embodiments. In some embodiments, fluid handling system 100B is a thermal energy (e.g., heat) transport system (e.g., heat handling system, thermal transport system). Fluid handling system 100B may be a heat pump system or a refrigeration system. Fluid handling system 100B may be configured to heat and/or cool an environment (e.g., an indoor space, a refrigerator, a freezer, etc.). In some embodiments, fluid handling system 100B includes more components, less components, same routing, different routing, and/or the like than that shown in FIG. 1B. Some of the features in FIG. 1B that have similar reference numbers as those in FIG. 1A may have similar properties, functions, and/or structures as those in FIG. 1A.

Hydraulic energy transfer system 110 (e.g., PX) may receive LP fluid in 120 from LP in system 122 (e.g., low pressure lift device 114, low pressure fluid pump, low pressure booster, low pressure compressor, etc.) and HP fluid in 130 from HP in system 132 (e.g., gas cooler 138, gas cooler, heat exchanger, etc.). The hydraulic energy transfer system 110 (e.g., PX) may exchange pressure between the LP fluid in 120 and HP fluid in 130 to provide HP fluid out 150 to HP out system 152 (e.g., high pressure lift device 159, high pressure fluid pump, high pressure booster, high pressure compressor, etc.) and to provide LP fluid out 140 to LP out system 142 (e.g., evaporator 144, heat exchanger, receiver 113, etc.). The LP out system 142 (e.g., evaporator 144) may provide the fluid to compressor 178 and low pressure lift device 114. The gas cooler 138 may receive fluid from compressor 178 and high pressure lift device 159. The gas cooler 138 may provide thermal energy from the fluid to another fluid that is circulated to turbine 128 to recover thermal energy and convert the thermal energy into kinetic energy. Controller 180 may control one or more components of fluid handling system 100B. High pressure lift device 159 may be a high pressure booster and low pressure lift device 114 may be a low pressure booster.

The fluid handling system 100B may be a closed system. LP fluid in 120, HP fluid in 130, LP fluid out 140, and HP fluid out 150 may all be a fluid (e.g., refrigerant, the same fluid) that is circulated in the closed system of fluid handling system 100B.

Fluid handling system 100B may additionally include one or more sensors configured to provide sensor data associated with the fluid. One or more flow valves may control flow-rates of the fluid based on sensor data received from the one or more sensors. In some embodiments, controller 180 causes one or more flow valves (not illustrated) to actuate based on sensor data received.

FIGS. 2A-E are exploded perspective views a rotary PX 40 (e.g., rotary pressure exchanger, rotary liquid piston compressor (LPC)), according to certain embodiments. Some of the features in one or more of FIGS. 2A-E may have similar properties, functions, and/or structures as those in one or more of FIGS. 1A-D.

PX 40 is configured to transfer pressure and/or work between a first fluid (e.g., refrigerant, particle free fluid, proppant free fluid, supercritical carbon dioxide, HP fluid in 130) and a second fluid (e.g., refrigerant, slurry fluid, frac fluid, superheated gaseous carbon dioxide, LP fluid in 120) with minimal mixing of the fluids. The rotary PX 40 may include a generally cylindrical body portion 42 that includes a sleeve 44 (e.g., rotor sleeve) and a rotor 46. The rotary PX 40 may also include two end caps 48 and 50 that include manifolds 52 and 54, respectively. Manifold 52 includes respective inlet port 56 and outlet port 58, while manifold 54 includes respective inlet port 60 and outlet port 62. In operation, these inlet ports 56, 60 enable the first and second fluids to enter the rotary PX 40 to exchange pressure, while the outlet ports 58, 62 enable the first and second fluids to then exit the rotary PX 40. In operation, the inlet port 56 may receive a high-pressure first fluid (e.g., HP fluid in 130) output from a gas cooler that provides corresponding thermal energy to a third fluid circulated to a turbine (e.g., turbine 128) to convert thermal energy into kinetic energy. After exchanging pressure, the outlet port 58 may be used to route a low-pressure first fluid (e.g., LP fluid out 140) out of the rotary PX 40. Similarly, the inlet port 60 may receive a low-pressure second fluid (e.g., low pressure slurry fluid, LP fluid in 120) from a booster configured to receive a portion of the gas from the receiver and increase pressure of the gas, and the outlet port 62 may be used to route a high-pressure second fluid (e.g., high pressure slurry fluid, HP fluid out 150) out of the rotary PX 40. The end caps 48 and 50 include respective end covers 64 and 66 (e.g., end plates) disposed within respective manifolds 52 and 54 that enable fluid sealing contact with the rotor 46.

One or more components of the PX 40, such as the rotor 46, the end cover 64, and/or the end cover 66, may be constructed from a wear-resistant material (e.g., carbide, cemented carbide, silicon carbide, tungsten carbide, etc.) with a hardness greater than a predetermined threshold (e.g., a Vickers hardness number that is at least 1000, 1250, 1500, 1750, 2000, 2250, or more). In some examples, tungsten carbide may be more durable and may provide improved wear resistance to abrasive fluids as compared to other materials, such as alumina ceramics. Additionally, in some embodiments, one or more components of the PX 40, such as the rotor 46, the end cover 64, the end cover 66, and/or other sealing surfaces of the PX 40, may include an insert. In some embodiments, the inserts may be constructed from one or more wear-resistant materials (e.g., carbide, cemented carbide, silicon carbide, tungsten carbide, etc.) with a hardness greater than a predetermined threshold (e.g., a Vickers hardness number that is at least 1000, 1250, 1500, 1750, 2000, 2250, or more) to provide improved wear resistance.

The rotor 46 may be cylindrical and disposed in the sleeve 44, which enables the rotor 46 to rotate about the axis 68. The rotor 46 may have a plurality of channels 70 (e.g., ducts, rotor ducts) extending substantially longitudinally through the rotor 46 with openings 72 and 74 (e.g., rotor ports) at each end arranged symmetrically about the longitudinal axis 68. The openings 72 and 74 of the rotor 46 are arranged for hydraulic communication with inlet and outlet apertures 76 and 78 (e.g., end cover inlet port and end cover outlet port) and 80 and 82 (e.g., end cover inlet port and end cover outlet port) in the end covers 64 and 66, in such a manner that during rotation the channels 70 are exposed to fluid at high-pressure and fluid at low-pressure. As illustrated, the inlet and outlet apertures 76 and 78 and 80 and 82 may be designed in the form of arcs or segments of a circle (e.g., C-shaped).

In some embodiments, a controller (e.g., controller 180 of FIGS. 1A-B) using sensor data (e.g., revolutions per minute measured through a tachometer or optical encoder, volumetric flow rate measured through flowmeter, etc.) may control the extent of mixing between the first and second fluids in the rotary PX 40, which may be used to improve the operability of the fluid handling system (e.g., fluid handling systems 100A-B of FIGS. 1A-B). In some examples, varying the volumetric flow rates of the first and/or second fluids entering the rotary PX 40 allows the operator (e.g., system operator, plant operator) to control the amount of fluid mixing within the PX 40. In addition, varying the rotational speed of the rotor 46 (e.g., via a motor) also allows the operator to control mixing. Three characteristics of the rotary PX 40 that affect mixing are: (1) the aspect ratio of the rotor channels 70; (2) the duration of exposure between the first and second fluids; and (3) the creation of a barrier (e.g., fluid barrier, piston, interface) between the first and second fluids within the rotor channels 70. First, the rotor channels 70 (e.g., ducts) are generally long and narrow, which stabilizes the flow within the rotary PX 40. In addition, the first and second fluids may move through the channels 70 in a plug flow regime with minimal axial mixing. Second, in certain embodiments, the speed of the rotor 46 reduces contact between the first and second fluids. In some examples, the speed of the rotor 46 (e.g., rotor speed of approximately 1200 revolutions per minute (RPM)) may reduce contact times between the first and second fluids to less than approximately 0.15 seconds, 0.10 seconds, or 0.05 seconds. Third, the rotor channel 70 (e.g., a small portion of the rotor channel 70) is used for the exchange of pressure between the first and second fluids. In some embodiments, a volume of fluid remains in the channel 70 as a barrier between the first and second fluids. All these mechanisms may limit mixing within the rotary PX 40. Moreover, in some embodiments, the rotary PX 40 may be designed to operate with internal pistons or other barriers, either complete or partial, that isolate the first and second fluids while enabling pressure transfer.

FIGS. 2B-2E are exploded views of an embodiment of the rotary PX 40 illustrating the sequence of positions of a single rotor channel 70 in the rotor 46 as the channel 70 rotates through a complete cycle. It is noted that FIGS. 2B-2E are simplifications of the rotary PX 40 showing one rotor channel 70, and the channel 70 is shown as having a circular cross-sectional shape. In other embodiments, the rotary PX 40 may include a plurality of channels 70 with the same or different cross-sectional shapes (e.g., circular, oval, square, rectangular, polygonal, etc.). Thus, FIGS. 2B-2E are simplifications for purposes of illustration, and other embodiments of the rotary PX 40 may have configurations different from those shown in FIGS. 2A-2E. As described in detail below, the rotary PX 40 facilitates pressure exchange between first and second fluids (e.g., a particulate-free fluid and a slurry fluid, higher pressure refrigerant and lower pressure refrigerant) by enabling the first and second fluids to briefly contact each other within the rotor 46. In some embodiments, the PX facilitates pressure exchange between first and second fluids by enabling the first and second fluids to contact opposing sides of a barrier (e.g., a reciprocating barrier, a piston, not shown). In some embodiments, this exchange happens at speeds that result in limited mixing of the first and second fluids. The speed of the pressure wave traveling through the rotor channel 70 (as soon as the channel is exposed to the aperture 76), the diffusion speeds of the fluids, and/or the rotational speed of rotor 46 may dictate whether any mixing occurs and to what extent.

Figure 2A:
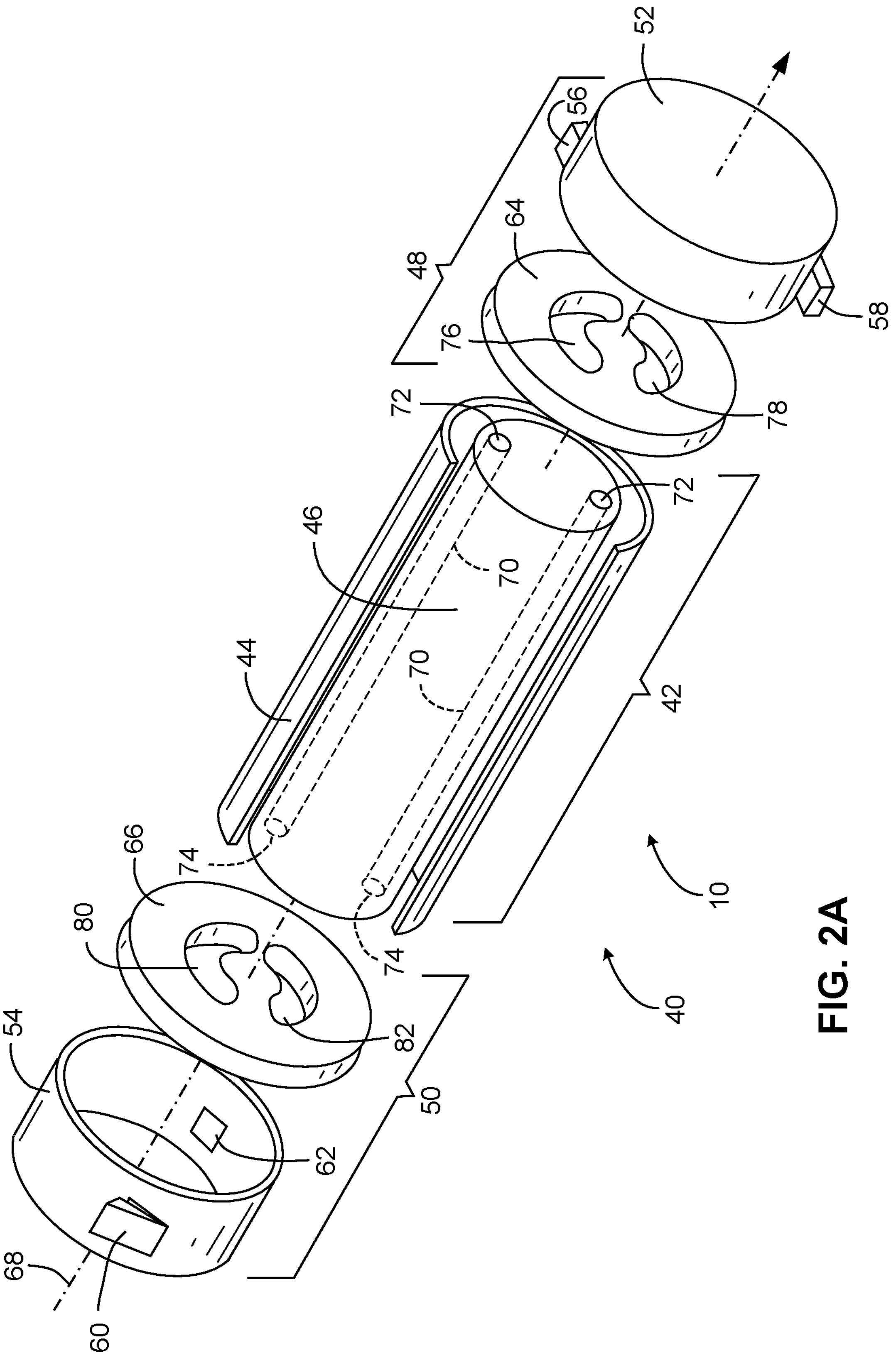
FIGS. 2A-E are exploded perspective views of pressure exchangers (PXs), according to certain embodiments.
Figure 2D:
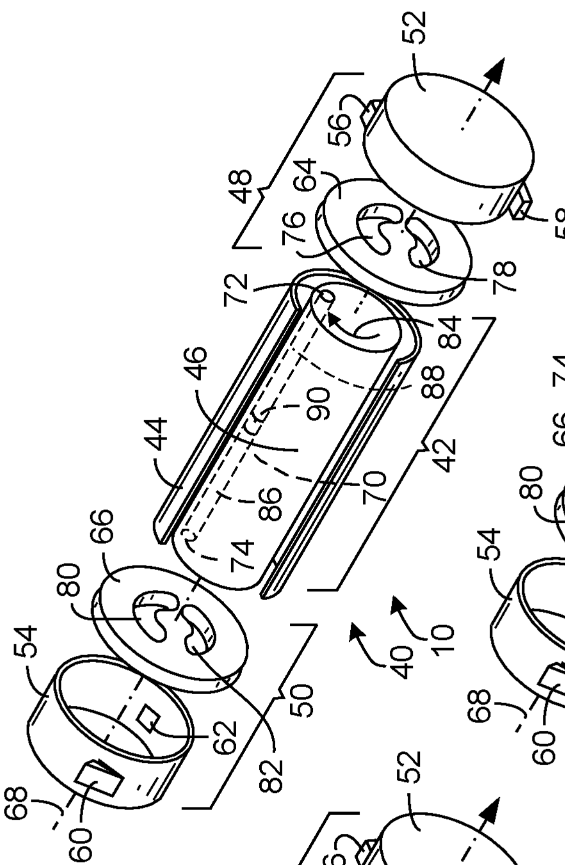
Figure 2E:
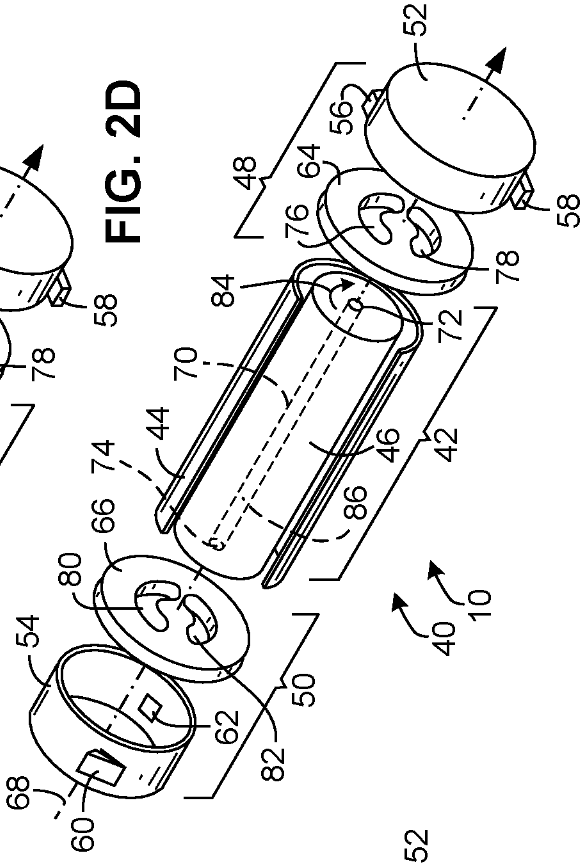
Figure 2B:
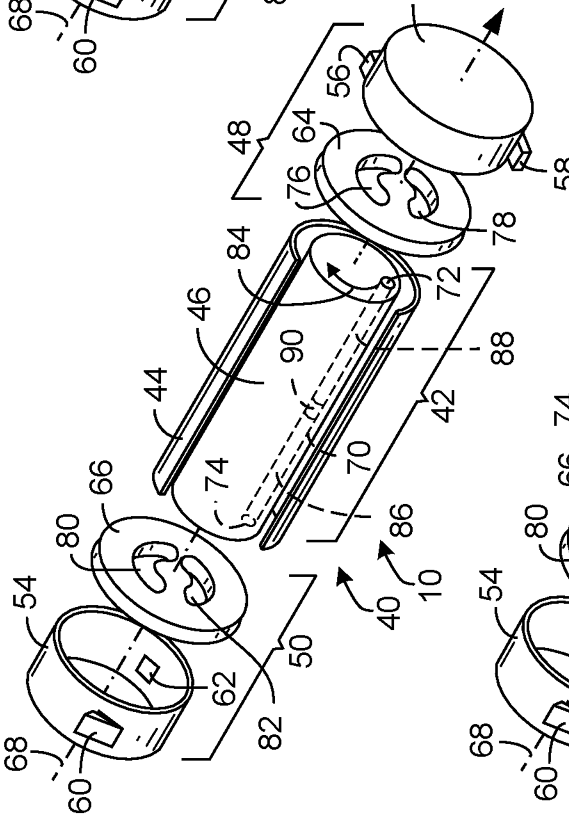

FIG. 2B is an exploded perspective view of an embodiment of a rotary PX 40 (e.g., rotary LPC), according to certain embodiments. In FIG. 2B, the channel opening 72 is in a first position. In the first position, the channel opening 72 is in fluid communication with the aperture 78 in end cover 64 and therefore with the manifold 52, while the opposing channel opening 74 is in hydraulic communication with the aperture 82 in end cover 66 and by extension with the manifold 54. The rotor 46 may rotate in the clockwise direction indicated by arrow 84. In operation, low-pressure second fluid 86 (e.g., low pressure slurry fluid) passes through end cover 66 and enters the channel 70, where it contacts the first fluid 88 at a dynamic fluid interface 90. The second fluid 86 then drives the first fluid 88 out of the channel 70, through end cover 64, and out of the rotary PX 40. However, because of the short duration of contact, there is minimal mixing between the second fluid 86 (e.g., slurry fluid) and the first fluid 88 (e.g., particulate-free fluid). In some embodiments, low pressure second fluid 86 contacts a first side of a barrier (e.g., a piston, not shown) disposed in channel 70 that is in contact (e.g., on an opposing side of the barrier) by first fluid 88. The second fluid 86 drives the barrier which pushes first fluid 88 out of the channel 70. In such embodiments, there is negligible mixing between the second fluid 86 and the first fluid 88.

Figure 2C:
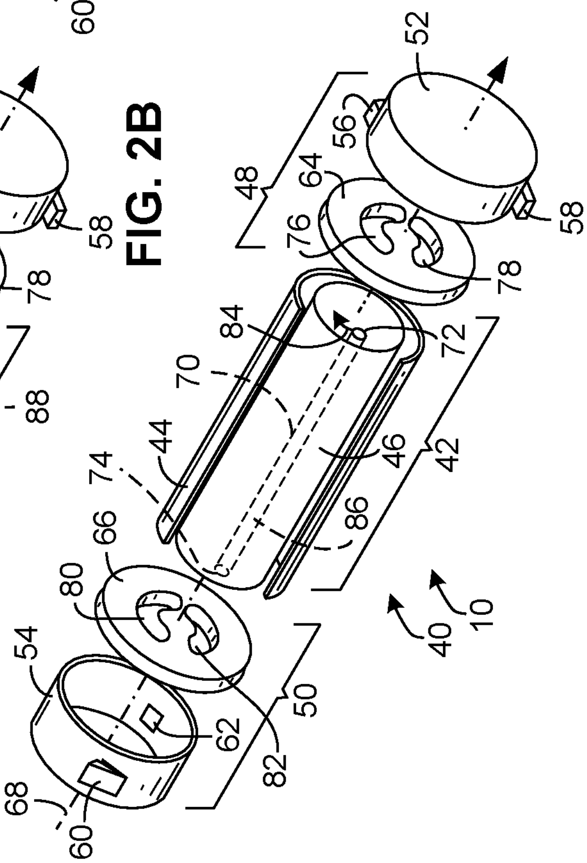

FIG. 2C is an exploded perspective view of an embodiment of a rotary PX 40 (e.g., rotary LPC), according to certain embodiments. In FIG. 2C, the channel 70 has rotated clockwise through an arc of approximately 90 degrees. In this position, the opening 74 (e.g., outlet) is no longer in fluid communication with the apertures 80 and 82 of end cover 66, and the opening 72 is no longer in fluid communication with the apertures 76 and 78 of end cover 64. Accordingly, the low-pressure second fluid 86 is temporarily contained within the channel 70.

FIG. 2D is an exploded perspective view of an embodiment of a rotary PX 40 (e.g., rotary LPC), according to certain embodiments. In FIG. 2D, the channel 70 has rotated through approximately 60 degrees of arc from the position shown in FIG. 2B. The opening 74 is now in fluid communication with aperture 80 in end cover 66, and the opening 72 of the channel 70 is now in fluid communication with aperture 76 of the end cover 64. In this position, high-pressure first fluid 88 enters and pressurizes the low-pressure second fluid 86, driving the second fluid 86 out of the rotor channel 70 and through the aperture 80.

FIG. 2E is an exploded perspective view of an embodiment of a rotary PX 40 (e.g., rotary LPC), according to certain embodiments. In FIG. 2E, the channel 70 has rotated through approximately 270 degrees of arc from the position shown in FIG. 2B. In this position, the opening 74 is no longer in fluid communication with the apertures 80 and 82 of end cover 66, and the opening 72 is no longer in fluid communication with the apertures 76 and 78 of end cover 64. Accordingly, the first fluid 88 is no longer pressurized and is temporarily contained within the channel 70 until the rotor 46 rotates another 90 degrees, starting the cycle over again.

Figure 3A:
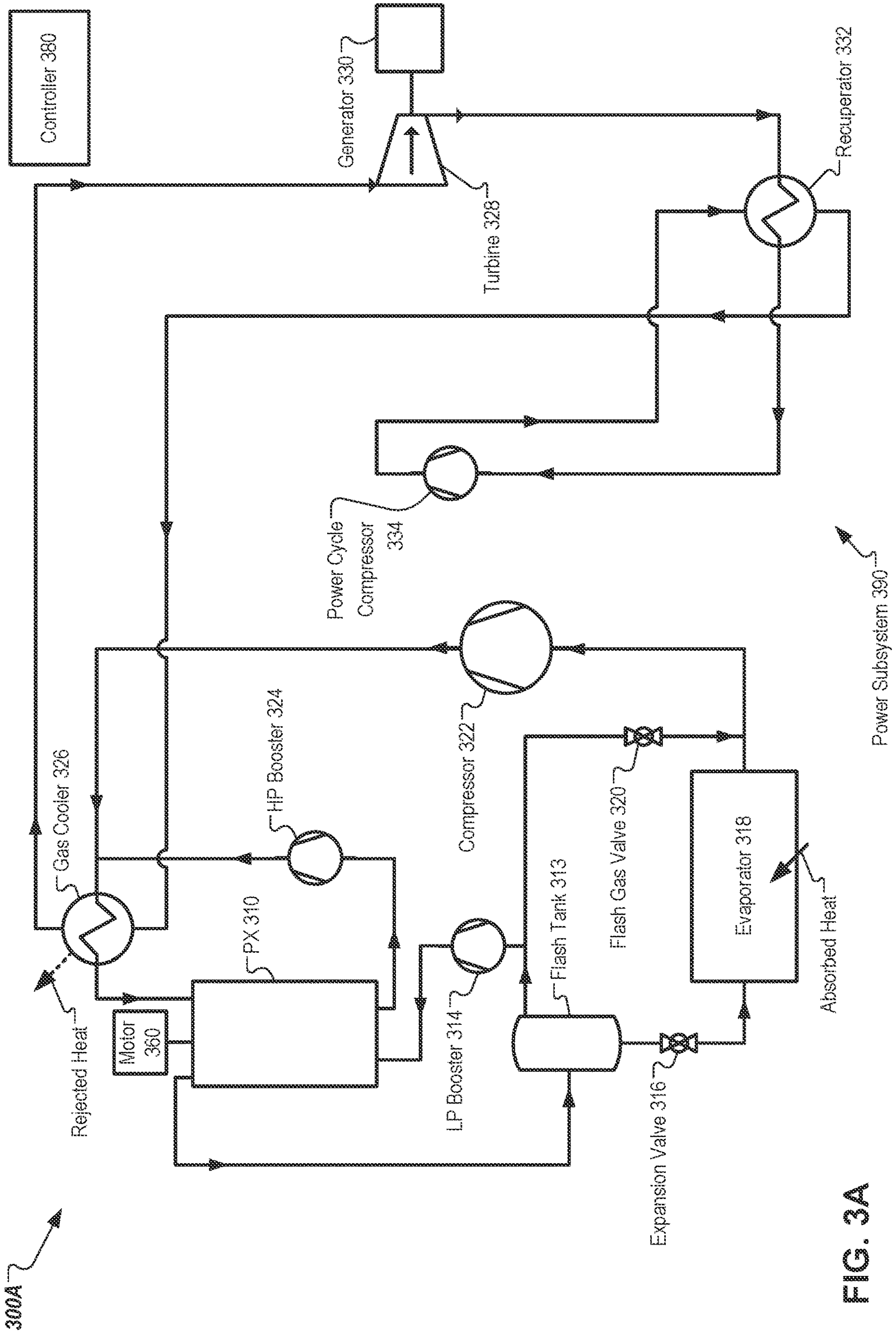
FIGS. 3A-C are schematic diagrams of heat pump systems including PXs, according to certain embodiments.
Figure 3B:
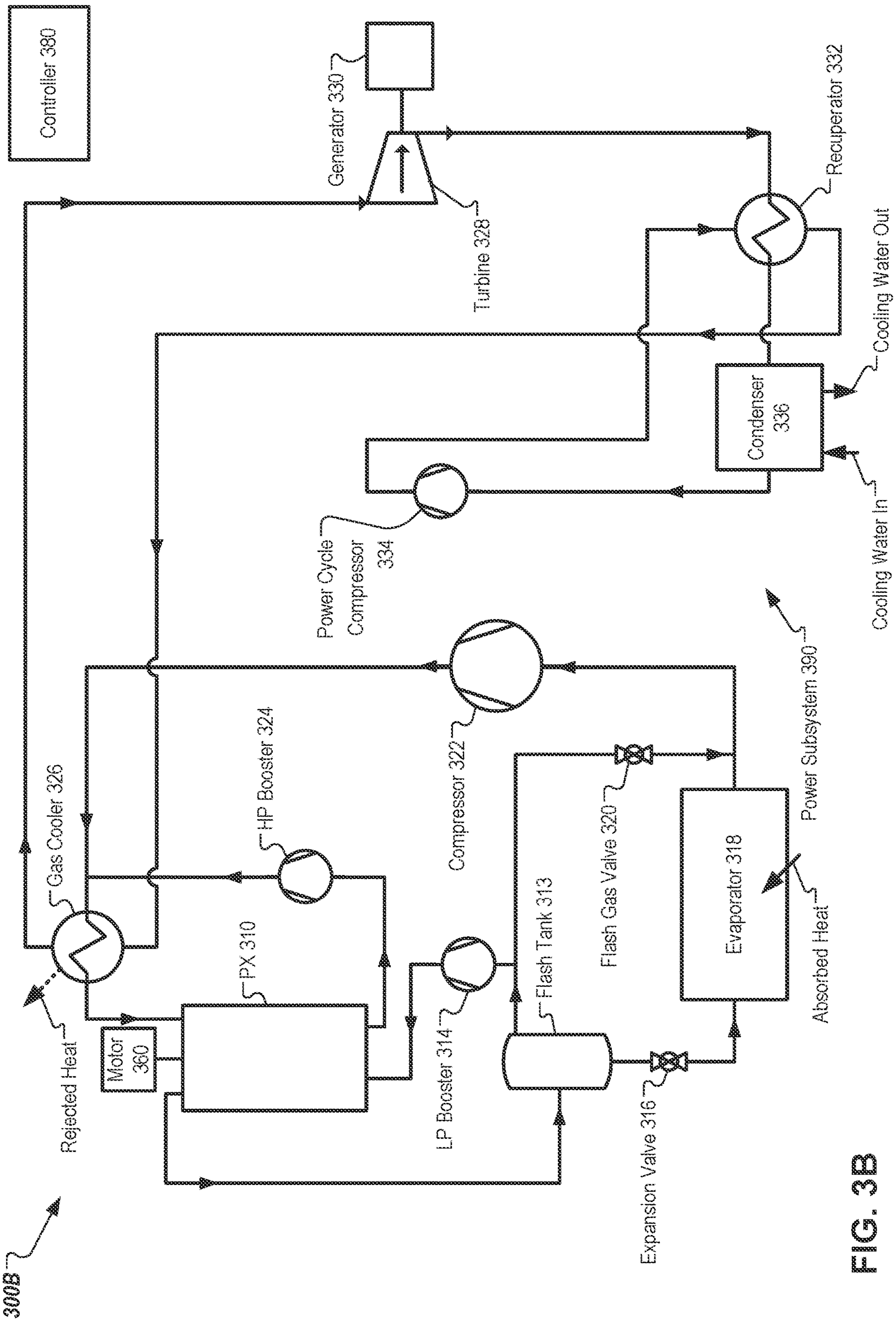
Figure 3C:
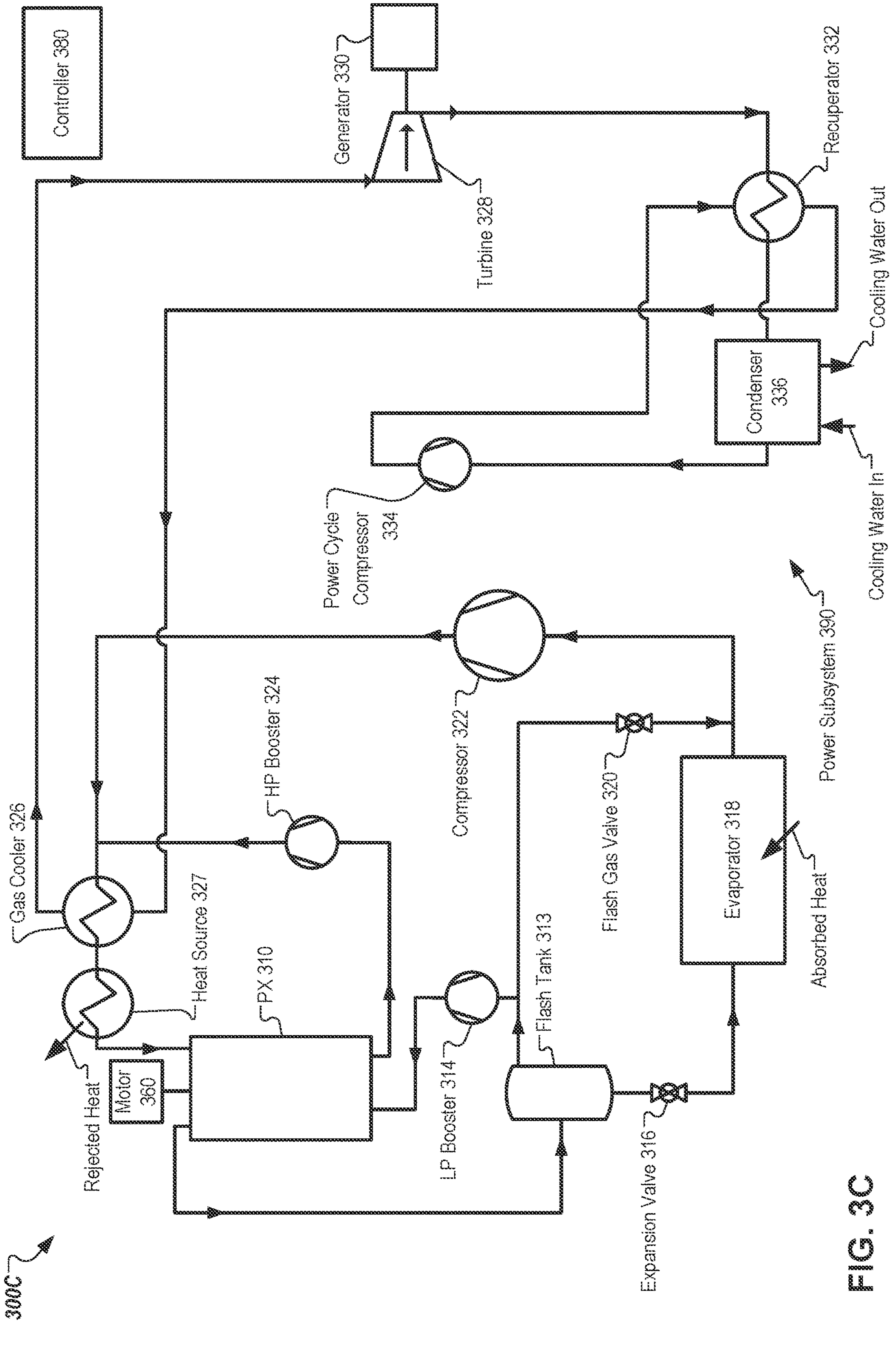

FIGS. 3A-C are schematic diagrams of heat pump systems 300A-C including PXs, according to certain embodiments. Some of the features in one or more of FIGS. 3A-C may have similar properties, functions, and/or structures as those in one or more of FIGS. 1A-B and/or one or more of FIGS. 2A-E. Systems of one or more of FIGS. 3A-C, FIGS. 4A-D, and/or FIG. 5 may be used to perform the methods of one or more of FIGS. 6A-C.

FIG. 3A is a schematic diagram of a heat pump system 300A including a PX 310, according to certain embodiments. In some embodiments, heat pump system 300A is a thermal energy transport system and/or a fluid handling system. PX 310 may be a rotary pressure exchanger. In some embodiments, PX 310 is an isobaric or substantially isobaric pressure exchanger. PX 310 may be configured to exchange pressure between a first fluid and a second fluid. In some embodiments, PX 310 is coupled to a motor 360 (e.g., rotation of a rotor of PX 310 is controlled by the motor 360). In some embodiments, the motor 360 controls the rotational speed of the PX 310. In some embodiments, the pressure of the fluid (e.g., the first fluid) in the gas cooler 326 may be related to the rotational speed of the PX 310. In some embodiments, a controller (e.g., controller 380) receives sensor data from one or more sensors of motor 360.

In some embodiments, PX 310 is configured to receive the first fluid at a high pressure (e.g., HP fluid in 130 of FIGS. 1A-B) via a high pressure inlet (e.g., a first inlet). In some embodiments, PX 310 is configured to receive the second fluid at a low pressure (e.g., LP fluid in 120 of FIGS. 1A-B) via a low pressure inlet (e.g., a second inlet). Although there is a reference to "high pressure" and "low pressure," "high pressure" and "low pressure" may be relative to one another and may not connote certain pressure values (e.g., the pressure of the HP fluid in 130 is higher than the pressure of LP fluid in 120). PX 310 may exchange pressure between the first fluid and the second fluid. PX 310 may output the first fluid via a low pressure outlet (e.g., LP fluid out 140, a first outlet) and may output the second fluid via a high pressure outlet (e.g., HP fluid out 150, a second outlet). In some embodiments, the first fluid provided via the low pressure outlet is at a low pressure and the second fluid provided via the high pressure outlet is at a high pressure.

In some embodiments, fluid handling system 300A includes a gas cooler 326, an evaporator 318, and a compressor 322. In some embodiments, fluid handling system 300A includes a power subsystem 390 (e.g., gas cooler 326, turbine 328, recuperator 332, and/or power cycle compressor 334, etc.). Power subsystem 390 may perform a cycle to generate power (e.g., via turbine 328 and/or generator 330).

In some embodiments, the fluid handling system 300A forms a heat pump and a power generation system. The gas cooler 326, evaporator 318, and/or the compressor 322, together with corresponding conduits (e.g., for fluid flow) may substantially make up the components of a heat pump system (e.g., are configured to perform the heat pump cycle). In some examples, heat is absorbed by system 300A from a heat source (e.g., a cold reservoir) via the evaporator 318 and the heat is rejected to a heat sink (e.g., a hot reservoir). In some embodiments, the heat is rejected to a power cycle fluid (e.g., of power subsystem 390) via gas cooler 326 and/or to an environment (e.g., a heated environment) via heat source 327 of FIG. 3C and/or via condenser 429 of FIGS. 4A-D and FIG. 5. In some embodiments, a refrigeration fluid facilitates heat transfer from the evaporator to the gas cooler (e.g., gas cooler 326, heat source 327, and/or condenser 429). In some embodiments, heat is rejected to a power cycle fluid (e.g., of power subsystem 390) and to an environment (e.g., to heat an indoor space, to reject heat to ambient air or ground) via the gas cooler 326. Compressor 322, included in heat pump system 300A in some embodiments, may increase corresponding pressure of the refrigeration fluid output by the evaporator 318. The compressor 322 may provide the refrigeration fluid to the gas cooler 326. In some embodiments, the refrigeration fluid is $CO_2$ or another suitable refrigeration fluid. The refrigeration fluid may flow substantially in a cycle (e.g., from gas cooler 326 to PX 310 to evaporator 318 to compressor 322 to gas cooler 326, etc.).

In some embodiments, fluid handling system 300A includes a gas cooler 326. Gas cooler 326 may provide corresponding thermal energy from the refrigeration fluid to the power cycle fluid. In some embodiments, the gas cooler 326 cools fluid (e.g., gas, supercritical gas, etc.) received from the compressor 322. The gas cooler 326 may provide the heat from the refrigeration fluid (e.g., gas) to the power cycle fluid. In some embodiments, the temperature of the refrigerant in the gas cooler 326 may be lowered, but the refrigerant may not condense (e.g., the fluid does not change phase from gas to liquid). In some embodiments, above the critical pressure of the fluid (e.g., of the refrigerant), the thermodynamic distinction between liquid and gas phases of the refrigerant within the gas cooler 326 disappears and there is only a single state of fluid called the supercritical state.

In some embodiments, the power cycle fluid is water. In some embodiments, the power cycle fluid is $CO_2$. In some embodiments the power cycle fluid is an organic fluid. In some embodiments the power cycle fluid is HFC-based refrigerant. Turbine 328 may receive the power cycle fluid output from the gas cooler 326. In some embodiments, the turbine 328 is mechanically coupled to generator 330 (e.g., via a shaft of turbine 328) and the generator 330 may be configured to generate electricity responsive to turbine 328 spinning (e.g., the shaft of turbine 328 may drive generator 330). In some embodiments, the generator 330 may generate electricity responsive to the turbine 328 converting corresponding thermal energy (e.g., of the third fluid output from the gas cooler 326) into kinetic energy (e.g., rotational kinetic energy). The turbine 328 may be coupled to the generator 330 by a direct coupling, by a gear train (e.g., two or more gears), by a chain drive, and/or by a belt drive. The turbine 328 may, in some embodiments, convert thermal energy from the power cycle fluid into kinetic energy (e.g., rotational kinetic energy). In some examples, the power cycle fluid flowing into the turbine 328 may have a first thermal energy level. Upon exiting the turbine 328, the power cycle fluid may have a second thermal energy level lower than the first thermal energy level. The turbine 328 may substantially convert the energy difference between the first and second thermal energy levels into kinetic energy. In some embodiments, the turbine 328 can produce power (e.g., electricity via generator 330) to power other components of the system, such as compressor 322, HP booster 324, and/or LP booster 314.

In some embodiments, fluid handling system 300A includes a power cycle compressor 334 as part of power subsystem 390. The power cycle compressor 334 may be a positive displacement compressor or a centrifugal compressor. The power cycle compressor 334 may increase pressure of the power cycle fluid (e.g., of the power subsystem 390) to flow the power cycle fluid through the power cycle (e.g., from gas cooler 326, to turbine 328, to recuperator 332, to power cycle compressor 334, etc.). In some embodiments, the power cycle compressor 334 is driven by a motor (e.g., an electric motor). The power cycle compressor 334 may increase pressure of the power cycle fluid a threshold amount to promote flow of the power cycle fluid through the power cycle flow path (e.g., from the power cycle compressor 334, to the recuperator 332, to the gas cooler 326, to the turbine 328, to the recuperator 332, to the power cycle compressor 334, etc.).

In some embodiments, the power cycle fluid flows through the recuperator 332. The recuperator 332 may be a counter-flow heat exchanger to receive an intake flow and an exhaust flow of the power cycle compressor 334. The recuperator 332 may be configured to recover waste heat in the power cycle fluid. The recuperator 332 may receive the power cycle fluid output from the turbine 328 (e.g., a first flow of power cycle fluid). Additionally, the recuperator 332 may receive the power cycle fluid output from the power cycle compressor 334 (e.g., a second flow of power cycle fluid). The flow of power cycle fluid from the power cycle compressor 334 (e.g., the second flow) and the flow of power cycle fluid from the turbine 328 (e.g., the first flow) may not mix and/or combine within recuperator 332. In some embodiments, recuperator 332 is to provide thermal energy from the first flow to the second flow. In some embodiments, the gas cooler 326 receives the power cycle fluid from the recuperator 332.

In some embodiments, fluid handling system 300A includes a low-pressure booster (e.g., LP booster 314) and/or a high-pressure booster (e.g., HP booster 324). Both LP booster 314 and HP booster 324 may be configured to increase (e.g., "boost") pressure of the second fluid. For instance, LP booster 314 may increase pressure of the second fluid provided to the low pressure inlet (e.g., the second inlet) of the PX 310. HP booster 324 may increase pressure of the second fluid output from the PX 310. LP booster 314 may increase pressure less than a threshold amount (e.g., LP booster 314 may operate over a pressure differential that is less than a threshold amount). In some examples, LP booster 314 may increase pressure of the second fluid approximately 10 to 60 psi. The second fluid may experience pressure loss (e.g., parasitic loss) as the second fluid flows from the LP booster 314 to the second inlet of the PX 310. HP booster 324 may increase pressure of the second fluid output from the PX 310 via the high pressure outlet (e.g., the second outlet). The HP booster 324 may increase pressure less than a threshold amount (e.g., HP booster 324 may operate over a pressure differential that is less than a threshold amount). In some examples, HP booster 324 may increase pressure of the second fluid approximately 10 to 60 psi. HP booster 324 may increase pressure of the second fluid to a pressure that substantially matches the pressure of fluid output from the compressor 322 (e.g., the pressure of gas cooler 326). In contrast to LP booster 314 and HP booster 324, the compressor 322 may increase pressure of fluid more than a threshold amount (e.g., compressor 322 may operate over a pressure differential that is greater than a threshold amount). In some examples, the compressor 322 may increase pressure of the fluid greater than approximately 200 psi. In some embodiments, controller 380 controls a flowrate of fluid through the PX 310 by controlling a flowrate of LP booster 314. In some examples, controller 380 may set a flowrate of LP booster 314 to control a flowrate of first fluid through the PX 310.

Fluid handling system 300A may include a flash tank 313 (e.g., receiver). In some embodiments, flash tank 313 is a receiver configured to receive a flow of fluid (e.g., first fluid) from the low pressure outlet of the PX 310. Flash tank 313 may form a chamber to collect the first fluid output from the low pressure outlet (e.g., the first outlet) of the PX 310. Flash tank 313 may receive the first fluid in a two-phase state (e.g., liquid and gas). In some embodiments, flash tank 313 is a tank constructed of welded sheet metal. In some embodiments, flash tank 313 is made of steel (e.g., steel sheet metal, steel plates, etc.). The first fluid (at a low pressure) may separate into gas and liquid inside flash tank 313. The liquid of the first fluid may settle in the bottom of the flash tank 313 while the gas of the first fluid may rise to the top of the flash tank 313. The liquid may flow from the flash tank 313 towards the evaporator 318 (e.g., via expansion valve 316). The chamber of flash tank 313 may be maintained at a set pressure (e.g., substantially maintained at a set pressure). The pressure may be set by a user (e.g., an operator, a technician, an engineer, etc.) and/or by a controller (e.g., controller 380). In some embodiments, the pressure of the flash tank 313 is controlled by one or more valves (e.g., expansion valve 316, flash gas valve 320, a pressure regulator valve, a safety valve, etc.). In some embodiments, the flash tank 313 includes at least one pressure sensor (e.g., a pressure transducer).

Fluid handling system 300A may include an expansion valve 316. In some embodiments, expansion valve 316 is disposed along a flow path between flash tank 313 and evaporator 318. Expansion valve 316 may be an adjustable valve (e.g., an electronic expansion valve, a thermostatic expansion valve, a ball valve, a gate valve, a poppet valve, etc.). Expansion valve 316 may be controllable by a user (e.g., a technician, an operator, an engineer, etc.) or by controller 380. In some embodiments, the expansion valve 316 is caused to actuate by controller 380 based on sensor data (e.g., pressure sensor data, flowrate sensor data, temperature sensor data, etc.). In some embodiments, expansion valve 316 is a thermal expansion valve. Expansion valve 316 may actuate (e.g., open and/or close) based on temperature data associated with the evaporator 318 (e.g., temperature data of the refrigeration fluid exiting the evaporator). In some examples, a sensing bulb (e.g., a temperature sensor, a pressure sensor dependent upon temperature, etc.) of the expansion valve 316 may increase or decrease pressure on a diaphragm of the expansion valve 316, causing a poppet valve coupled to the diaphragm to open or close, thus causing more or less flow of fluid to the evaporator 318, thereby causing more or less expansion of the fluid flowing through the expansion valve 316. The sensing bulb of the expansion valve may be positioned proximate to the downstream end of the evaporator 318 (e.g., proximate the fluid outlet of the evaporator 318) and may be fluidly coupled to the diaphragm via a sensing capillary (e.g., a conduit between the sensing bulb and the expansion valve 316). In some embodiments, expansion valve 316 is controlled and actuated entirely based on electronic commands (e.g., from controller 380).

Fluid handling system 300A may include a flash gas valve 320 disposed along a flash gas bypass flow path. In some embodiments, flash gas valve 320 regulates a flow of gas from a gas outlet of the flash tank 313. In some embodiments, the flow of gas from the flash tank 313 flows along the flash gas bypass flow path to bypass the evaporator 318. In some embodiments, the flash gas bypass flow path is between flash tank 313 and a location downstream of an outlet of the evaporator 318. The gas flowing along the flash gas bypass flow path may be combined with output of the evaporator 318. In some embodiments, flash gas valve 320 may be a bypass valve to regulate the flow of bypass gas (e.g., gas flowing along the gas bypass flow path). The flash gas valve 320 may cause gas collected in the flash tank 313 to expand (e.g., decrease in pressure) as the gas flows toward the compressor 322. The flash gas valve 320 may, in some embodiments, be an adjustable valve. In some embodiments, the flash gas valve 320 is caused to actuate by controller 380 based on sensor data.

In some embodiments, LP booster 314 receives a flow of fluid from flash tank 313. In some examples, LP booster 314 receives a portion of the gas flowing along the flash gas bypass flow path between flash tank 313 and the flash gas valve 320, the LP booster 314 receiving a portion of gas diverted from the flash gas bypass flow path. In some embodiments, the LP booster 314 receives the fluid and increases pressure of the fluid to form the second fluid (e.g., the second fluid provided to the second outlet of the PX 310). In some embodiments, LP booster 314 is a compressor or pump that operates over a low pressure differential to "boost" the pressure of the gas received from flash tank 313. In some embodiments, the HP booster 324 is a compressor that operates over a low pressure differential to "boost" the pressure of the fluid (e.g., second fluid) received from the second outlet of the PX. In some embodiments, a compressor is configured to increase pressure of a fluid substantially made up of gas, while a pump is configured to increase pressure of a fluid substantially made up of liquid.

In some embodiments, evaporator 318 exchanges thermal energy between an environment (e.g., a medium of an environment) and refrigeration fluid. In some examples, evaporator 318 may provide thermal energy (e.g., heat) from ambient air (e.g., cold outside air) to refrigeration fluid. In some embodiments, evaporator 318 obtains thermal energy from an environment that is meets a threshold temperature (e.g., cold ground, a cold lake or river, a cold exterior environment, etc.). In some examples, the environment can be an exterior space (e.g., outside a building in a climate that meets a threshold temperature). In some examples, the evaporator 318 may be placed in the ground and facilitate the transfer of thermal energy from the ground to the refrigeration fluid.

Fluid handling system 300A may include a controller 380 (e.g., controller 180 of FIGS. 1A-D). Controller 380 may control the boosters and/or compressors of system 300A. Controller 380 may receive sensor data from one or more sensors of system 300A. The controller 380 may process the sensor data to control system 300A. The sensors may include pressure sensors, flowrate sensors, and/or temperature sensors. In some embodiments, controller 380 controls a motor coupled to PX 310 (e.g., motor 360). In some embodiments, controller 380 receives motor data from one or more motor sensors associated with the motor 360. Motor data received from motor sensors may include current motor speed (e.g., revolutions per minute), total motor run time, motor run time between maintenance operations, and/or total motor revolutions. Motor data may be indicative of a performance state of the motor 360.

In some embodiments, controller 380 receives sensor data indicative of a temperature of a refrigerated space (e.g., the cold reservoir proximate evaporator 318) and/or a temperature of a heated space (e.g., the hot reservoir proximate the gas cooler 326, the third fluid, etc.). Controller 380 may control LP booster 314, HP booster 324, and/or compressor 322 based on sensor data received from one or more sensors of the fluid handling system 300A (e.g., one or more fluid flowrate sensors, temperature sensors, pressure sensors, etc.). In some embodiments, one or more sensors (e.g., pressure sensors, flow sensors, temperature sensors, etc.) are disposed proximate inlets and/or outlets of the various components of the fluid handling system 300A. In some embodiments, one or more sensors are disposed internal to the components of the fluid handling system 300A. In some examples, a pressure sensor may be disposed proximate the inlet of the compressor 322 and an additional pressure sensor may be disposed proximate the outlet of the compressor 322. In some examples, a temperature sensor may be disposed proximate the inlet of the evaporator 318 and another temperature sensor may be disposed proximate the outlet of the evaporator 318. In a similar example, a temperature sensor may be disposed internal to the gas cooler 326. In a further example, a flow sensor may be located at each of the inlets and outlets of the PX 310 to measure a flow of the first fluid and the second fluid into and out of the PX 310.

Described herein are references to "first fluid," "second fluid," and "third fluid." In some embodiments, the first fluid and the second fluid are the same type of fluid (e.g., are a refrigeration fluid flowing in a fluid handling system). The third fluid may be another type of fluid (e.g., fluid used in power subsystem 390). "First fluid" may refer to fluid flowing through the PX 310 from the high pressure inlet to the low pressure outlet of the PX 310 and/or fluid flowing to or from the high pressure inlet and/or the low pressure outlet of the PX 310. "Second fluid" may refer to fluid flowing through the PX 310 from the low pressure inlet to the high pressure outlet of the PX 310 and/or fluid flowing to or from the low pressure inlet and/or the high pressure outlet of the PX 310. "Third fluid" may refer to fluid flowing through the turbine 328. In some embodiments, the first fluid may be a refrigerant fluid in a supercritical state (e.g., supercritical $CO_2$). In some embodiments, the first fluid may be a refrigerant fluid in a liquid state (e.g., liquid $CO_2$). In some embodiments, the second fluid may be a refrigerant fluid in a gaseous state (e.g., $CO_2$ vapor). In some embodiments, the second fluid may be a refrigerant fluid in a two-phase state (e.g., a liquid-gas mixture of $CO_2$). In some embodiments, the second fluid may be a refrigerant fluid in a liquid state (e.g., liquid $CO_2$).

FIG. 3B is a schematic diagram of a heat pump system 300B that includes a pressure exchanger (PX), according to certain embodiments. In some embodiments, heat pump system 300B is a thermal energy transport system and/or a fluid handling system. In some embodiments, features that have reference numbers that are similar to reference numbers in other figures include similar properties, structures, and/or functionality as those described in other figures. In some examples, features of fluid handling system 300B have similar properties, structures, and/or functionality as fluid handling system 300A of FIG. 3A.

Fluid handling system 300B may include a condenser 336 as part of power subsystem 390. The condenser 336 may be a heat exchanger to exchange thermal energy between a power cycle fluid (e.g., third fluid) and a cooling fluid (e.g., water, etc.). In some embodiments, the condenser 336 is a heat exchanger that provides the heat from the refrigerant (e.g., the first fluid) to an environment. In some embodiments, the condenser 336 is a heat exchanger that condenses fluid flowing through the condenser 336 (e.g., while cooling the fluid). In some embodiments, the condenser 336 is a heat exchanger that does not condense fluid flowing through the condenser 336 (e.g., cools the fluid without condensing the fluid). The phase of the refrigerant may change from gas to liquid (e.g., condense) within the condenser 336. In some embodiments, the pressure of the fluid within the condenser 336 is above the critical pressure of the fluid. Thus, in some embodiments, the condenser 336 is merely a gas cooler because the fluid (e.g., in a gaseous state) does not condense. The condenser 336 may provide the heat from the fluid (e.g., gas) to a corresponding environment. In some embodiments, the temperature of the fluid in the condenser 336 may be lowered, but the fluid may not condense e.g., the fluid does not change phase from gas to liquid). In some embodiments, above the critical pressure of the fluid (e.g., of the refrigerant), the thermodynamic distinction between liquid and gas phases of the fluid within the condenser 336 disappears and there is only a single state of fluid called the supercritical state. In some embodiments, the condenser 336 receives the third fluid output from the recuperator 332 (e.g., the third fluid flowing from the recuperator 332 toward the power cycle compressor 334). The condenser 336 may also receive a flow of cooling water (e.g., from a cooling water tower, etc.). The condenser 336 may facilitate heat transfer from the third fluid to the cooling water to decrease temperature of the third fluid. The power cycle compressor 334 may receive the third fluid output from the condenser 336. In some embodiments, the cooling water received by condenser 336 is water, but the cooling water can be any suitable cooling fluid (e.g., water, refrigeration fluid, alcohol, etc.).

FIG. 3C is a schematic diagram of a fluid handling system 300C that includes a pressure exchanger (PX) according to certain embodiments. In some embodiments, heat pump system 300C is a thermal energy transport system and/or a fluid handling system. In some embodiments, features that have reference numbers that are similar to reference numbers in other figures include similar properties, structures, and/or functionality as those described in other figures. In some examples, features of fluid handling system 300C have similar properties, structures, and/or functionality as fluid handling systems 300A-B of FIGS. 3A-B.

Fluid handling system 300C may include a heat source 327. Heat source 327 may be a heat exchanger to provide (e.g., exchange) corresponding thermal energy from the first fluid to a corresponding environment. In some examples, the heat source 327 may radiate thermal energy from the first fluid to an environment such as an interior of a building, etc. In some embodiments, heat source 327 is a condenser (e.g., condenser 429 described herein with reference to FIGS. 4A-4D). The heat source 327 may receive the first fluid output from the gas cooler 326 and provide the first fluid to the high pressure inlet (e.g., the first inlet) of the PX 310. In some embodiments, the heat source 327 is a radiator and/or a network of radiators for heating (e.g., for heating a room, etc.).

Figure 4A:
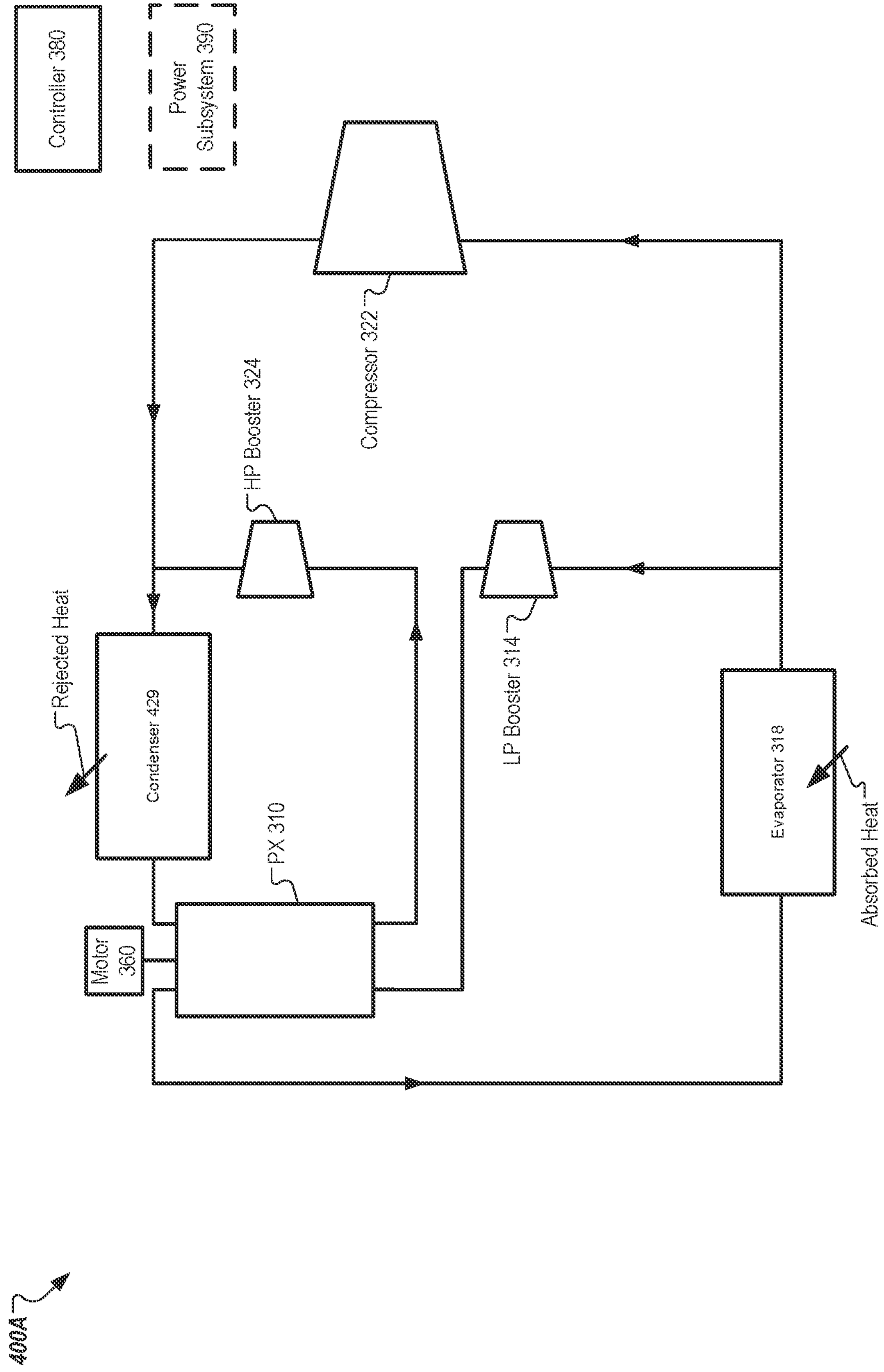
FIGS. 4A-D are schematic diagrams of heat pump systems including PXs, according to certain embodiments.

FIG. 4A is a schematic diagram of a heat pump system 400A that includes a pressure exchanger (PX) according to certain embodiments. In some embodiments, heat pump system 400A is a thermal energy transport system and/or a fluid handling system. In some embodiments, features that have reference numbers that are similar to reference numbers in other figures include similar properties, structures, and/or functionality as those described in other figures. In some examples, features of fluid handling system 400A have similar properties, structures, and/or functionality as fluid handling system 300A of FIG. 3A. In some embodiments, fluid handling system 400A includes power subsystem 390, similar to one of systems 300A-300C as depicted in FIGS. 3A-3C.

Fluid handling system 400A may include a PX 310, an evaporator 318, a compressor 322, an LP booster 314, an HP booster 324, and/or a condenser 429. In some embodiments, condenser 429 is a heat exchanger to transfer corresponding thermal energy (e.g., heat) between refrigeration fluid and an environment. In some embodiments, the condenser 429 is a heat exchanger that condenses fluid flowing through the condenser 429 (e.g., while cooling the fluid). In some embodiments, the condenser 429 is a heat exchanger that does not condense fluid flowing through the condenser 429 (e.g., cools the fluid without condenser the fluid). In some embodiments, the condenser 429 is a heat exchanger that provides the heat from the refrigerant (e.g., the first fluid) to an environment. The phase of the refrigerant may change from gas to liquid (e.g., condense) within the condenser 429. In some embodiments, the pressure of the fluid within the condenser 429 is above the critical pressure of the fluid. Thus, in some embodiments, the condenser 429 is merely a gas cooler because the fluid (e.g., in a gaseous state) does not condense. The condenser 429 may provide the heat from the fluid (e.g., gas) to a corresponding environment. In some embodiments, the temperature of the fluid in the condenser 429 may be lowered, but the fluid may not condense e.g., the fluid does not change phase from gas to liquid). In some embodiments, above the critical pressure of the fluid (e.g., of the refrigerant), the thermodynamic distinction between liquid and gas phases of the fluid within the condenser 429 disappears and there is only a single state of fluid called the supercritical state. In some embodiments, the condenser 429 is to provide the first fluid to the high pressure inlet (e.g., the first inlet) of PX 310. In some embodiments, thermal energy is provided (e.g., heat is absorbed, thermal energy is exchanged, etc.) to refrigeration fluid via evaporator 318. Thermal energy may be provided (e.g., heat is rejected) to a corresponding environment via condenser 429. In some embodiments, heat is provided to a thermal sink (e.g., a hot sink, a hot reservoir, etc.). In some examples, heat rejected via condenser 429 (e.g., from the first fluid) can be used to heat a space such as the inside of a building, etc.

In some embodiments, the exterior of evaporator 318 may be exposed to a low temperature thermal source (e.g., a cold sink, a cold reservoir, etc.). In some examples, the exterior of evaporator 318 may be exposed to ambient air (e.g., cold air) outside a building. The evaporator 318 may provide thermal energy from the ambient air to refrigeration fluid flowing through the evaporator 318. In some examples, evaporator 318 may be buried under ground. The ground may be cold (e.g., colder than ambient). The evaporator 318 may provide thermal energy from the (cold) ground to refrigeration fluid flowing through the evaporator 318. The condenser 429 (and/or heat source 327) may be exposed to a warm temperature thermal sink (e.g., a hot sink, a hot reservoir, etc.). In some examples, the exterior of the condenser 429 may be exposed to warm air inside a building. The condenser 429 may provide thermal energy from refrigeration fluid (e.g., the first fluid) flowing through the condenser 429 to the inside of the building. In some examples, the condenser 429 may be a radiator or a network of radiators to heat the inside of a building or dwelling place, etc.

In some embodiments, system 400A is a refrigeration system capable of cooling an environment (e.g., an indoor space). In such a refrigeration system, the condenser 429 is placed indoors and the evaporator 318 is placed outdoors. In a refrigeration system, the evaporator absorbs heat from the ambient and vaporize the two phase refrigerant fluid flowing through the evaporator before sending it to the inlet of the compressor. In some embodiments, to switch from a heat pump system to a refrigeration or air-cooling system, a reversing valve may be used to cause the fluid flow exiting the compressor 322 to be switchable between being directed towards the inlet of the outdoor unit or towards the inlet of the indoor unit. In some embodiments, one or more valves and piping may be used to cause fluid flow to be directed in the same direction through all of the components (e.g., one or more the PX 310, LP booster 314, HP booster 324, compressor 322, and/or the like) while switching the fluid flow from indoor unit to outdoor unit.

The direction of transfer of thermal energy (e.g., heat transfer) of the system 400A may be reversible in some embodiments. For example, in refrigeration/air-conditioning/air cooling implementations of system 400A, the condenser 429 placed outdoors rejects heat (e.g., provide corresponding thermal energy from the refrigeration fluid to the corresponding environment) and the evaporator 318 can absorb heat (e.g., provide corresponding thermal energy from the corresponding environment to the refrigeration fluid). While in heat pump implementation of system 400A, the condenser 429 placed indoors rejects heat to its indoor environment and evaporator 318 absorbs heat from its outdoor environment. In some embodiments, system 400A includes one or more valves (e.g., a reversing valve, diversion valve(s), etc.) to reverse the function of system 400A (e.g., reverse the flow of thermal energy facilitated by system 400A). In some embodiments, one or more flows of refrigeration fluid (e.g., to/from the PX 310, to/from the HP booster 324, to/from the LP booster 314, to/from the compressor 322, to/from the condenser 429, and/or to/from the evaporator 318) may be reversed and/or diverted. In some examples, one or more reversing or diversion valves included in system 400A in some embodiments can direct fluid from the compressor 322 toward the outdoor unit. Similar valves may direct fluid from the compressor 322 to the indoor unit.

Reversibility of system 400A may be controlled (e.g., via controller 380, via a programmable thermostat disposed in the indoor space, via user input, etc.). In some examples, the controller 380 may determine (e.g., based on temperature data, based on user input, based on a schedule) whether to use system 400A to heat an indoor space or to cool an indoor space. In some embodiments, the controller 380 may cause one or more valves (e.g., reversing valve, diversion valve(s), etc.) to actuate to cause fluid flow through the system to reverse. In embodiments where the function of system 400A is reversible (e.g., reversible between heating and cooling an indoor space), evaporator 318 may be an interior heat exchanger (e.g., disposed within an interior space, disposed in an air handler system providing airflow to an indoor space) and the condenser 429 may be an exterior heat exchanger (e.g., disposed outside the interior space). In other embodiments the evaporator 318 may be an outdoor heat exchanger and condenser 429 may be an indoor heat exchanger.

In some embodiments, the systems described herein (e.g., systems of one or more of FIGS. 1A-7) can be used to heat an interior space, to cool an interior space, and/or selectively (e.g., reversibly) heat and cool a space.

Figure 4B:
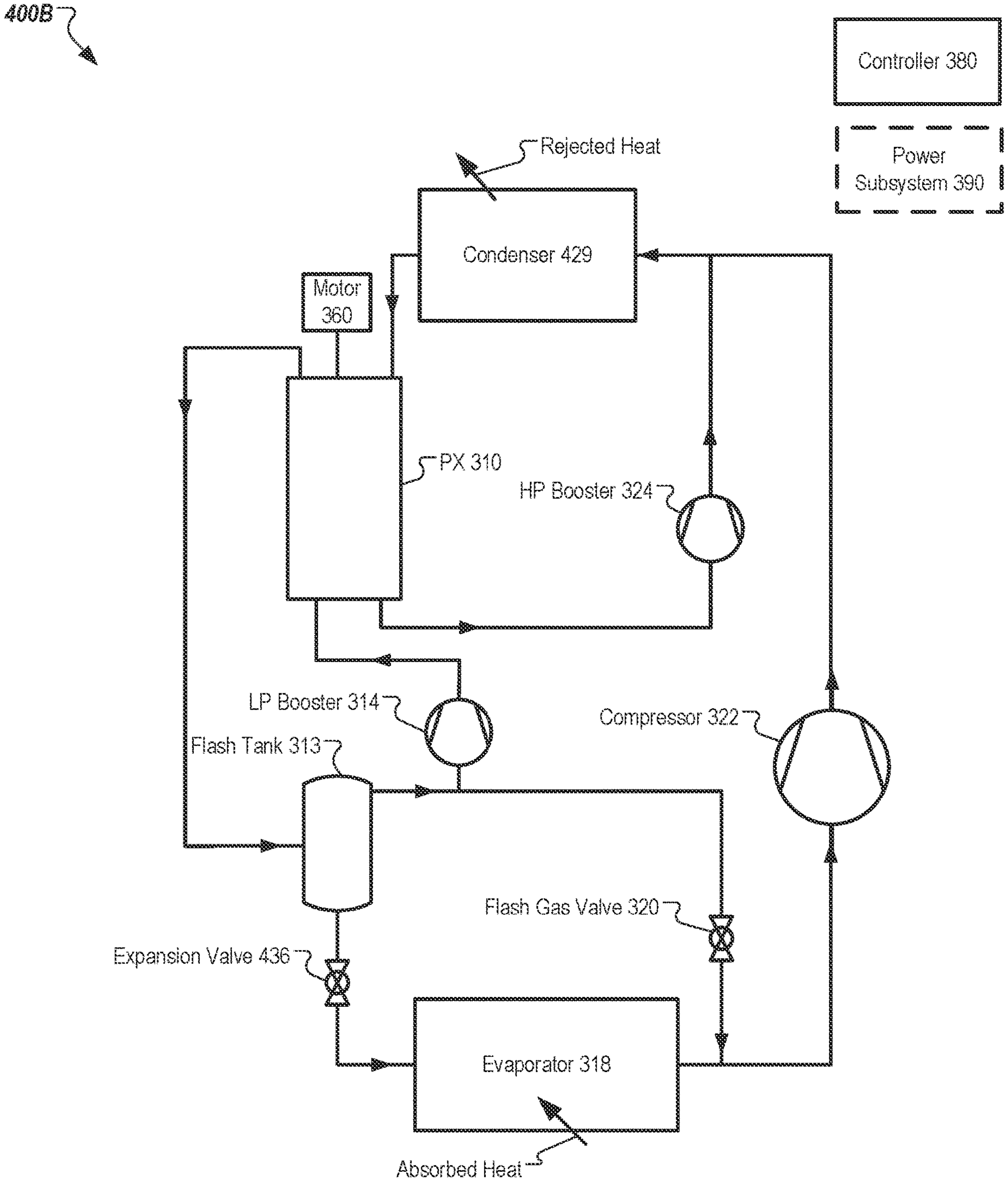

FIG. 4B is a schematic diagram of a heat pump system 400B that includes a pressure exchanger (PX) according to certain embodiments. In some embodiments, heat pump system 400B is a thermal energy transport system and/or a fluid handling system. In some embodiments, features that have reference numbers that are similar to reference numbers in other figures include similar properties, structures, and/or functionality as those described in other figures. In some examples, features of fluid handling system 400B have similar properties, structures, and/or functionality as fluid handling system 300A of FIG. 3A. In some embodiments, fluid handling system 400B includes power subsystem 390, similar to one of systems 300A-300C as depicted in FIGS. 3A-3C.

Fluid handling system 400B may be substantially similar to fluid handling system 300A of FIG. 3A. Similar to fluid handling system 400A, fluid handling system 400B may include condenser 429 to provide corresponding thermal energy from high pressure refrigeration fluid to a corresponding environment. The condenser 429 may provide the high pressure refrigeration fluid (e.g., first fluid) to the high pressure inlet (e.g., the first inlet) of the PX 310. The second fluid output via the high pressure outlet (e.g., the second outlet) of the PX 310 may be received by the HP booster 324. The second fluid may be combined with an output of the compressor 322.

Figure 4C:
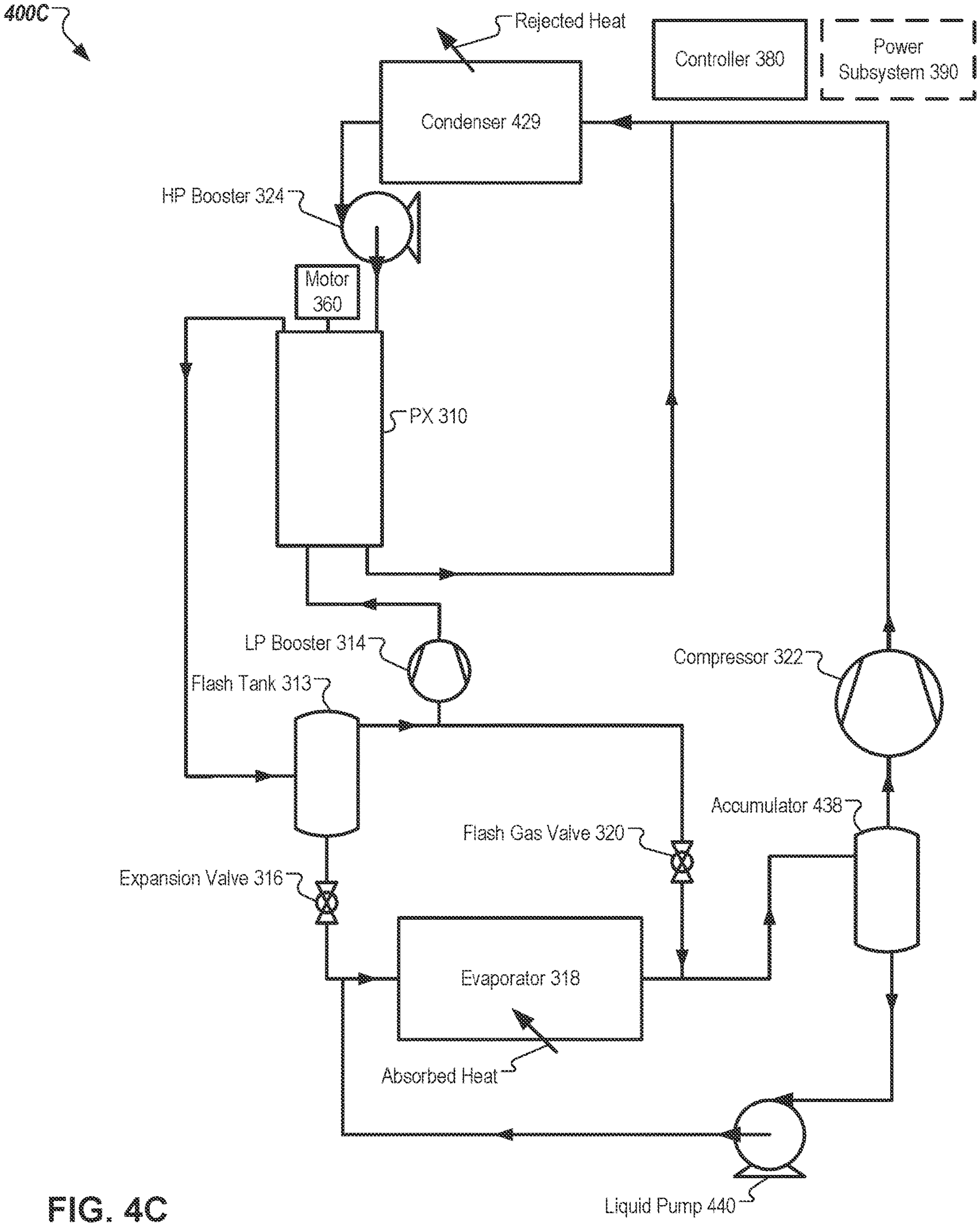

FIG. 4C is a schematic diagram of a heat pump system 400C that includes a pressure exchanger (PX) according to certain embodiments. In some embodiments, heat pump system 400C is a thermal energy transport system and/or a fluid handling system. In some embodiments, features that have reference numbers that are similar to reference numbers in other figures include similar properties, structures, and/or functionality as those described in other figures. In some examples, features of fluid handling system 400C have similar properties, structures, and/or functionality as fluid handling system 300A of FIG. 3A. In some embodiments, fluid handling system 400C includes power subsystem 390, similar to one of systems 300A-300C as depicted in FIGS. 3A-3C.

In some embodiments, the evaporator 318 of the fluid handling system 400C may be operated in a flooded state. In some examples, evaporator 318 may flow both liquid and gas. Operating the evaporator 318 in a flooded state may allow for an increase in pressure of the suction side of the compressor 322 (e.g., the upstream side of the compressor 322), thereby reducing the pressure differential overcome by the compressor 322 and thus reducing the energy used by the compressor 322 and increasing system efficiency. In some embodiments, fluid leaving the evaporator 318 (e.g., through the outlet of the evaporator 318) may be in the two-phase state (e.g., liquid and gas). Liquid may accumulate in accumulator 438. In some embodiments, accumulator 438 is a receiver to receive fluid output from the evaporator 318 and the flash gas bypass (e.g., the flash gas valve 320). In some embodiments, accumulator 438 forms a chamber similar to flash tank 313. The chamber of accumulator 438 may be maintained at a substantially constant (e.g., semi-constant, substantially constant, etc.) pressure. In some embodiments, the accumulator 438 includes one or more pressure sensors. Gas from the accumulator 438 may flow to the compressor 322.

Fluid handling system 400C may include a liquid pump 440. In some embodiments, liquid pump 440 may pump liquid from the accumulator 438 to be combined with output from the expansion valve 316 (e.g., to flow into the evaporator 318). The liquid pumped by liquid pump 440 may combine with an output from the expansion valve 316 to flow into the evaporator 318. Liquid pump 440 may be controlled by controller 380. In some embodiments, fluid exiting the condenser 429 is in a liquid state. Thus, in some embodiments, HP booster 324 pumps liquid provided from the outlet of condenser 429 to the high pressure inlet of the PX 310. The HP booster 324 may increase the pressure of the liquid flowing from the condenser 429 to the high pressure inlet of the PX 310. The second fluid exiting the high pressure outlet of the PX 310 may be combined with output of the compressor 322 to flow into the condenser 429.

Figure 4D:
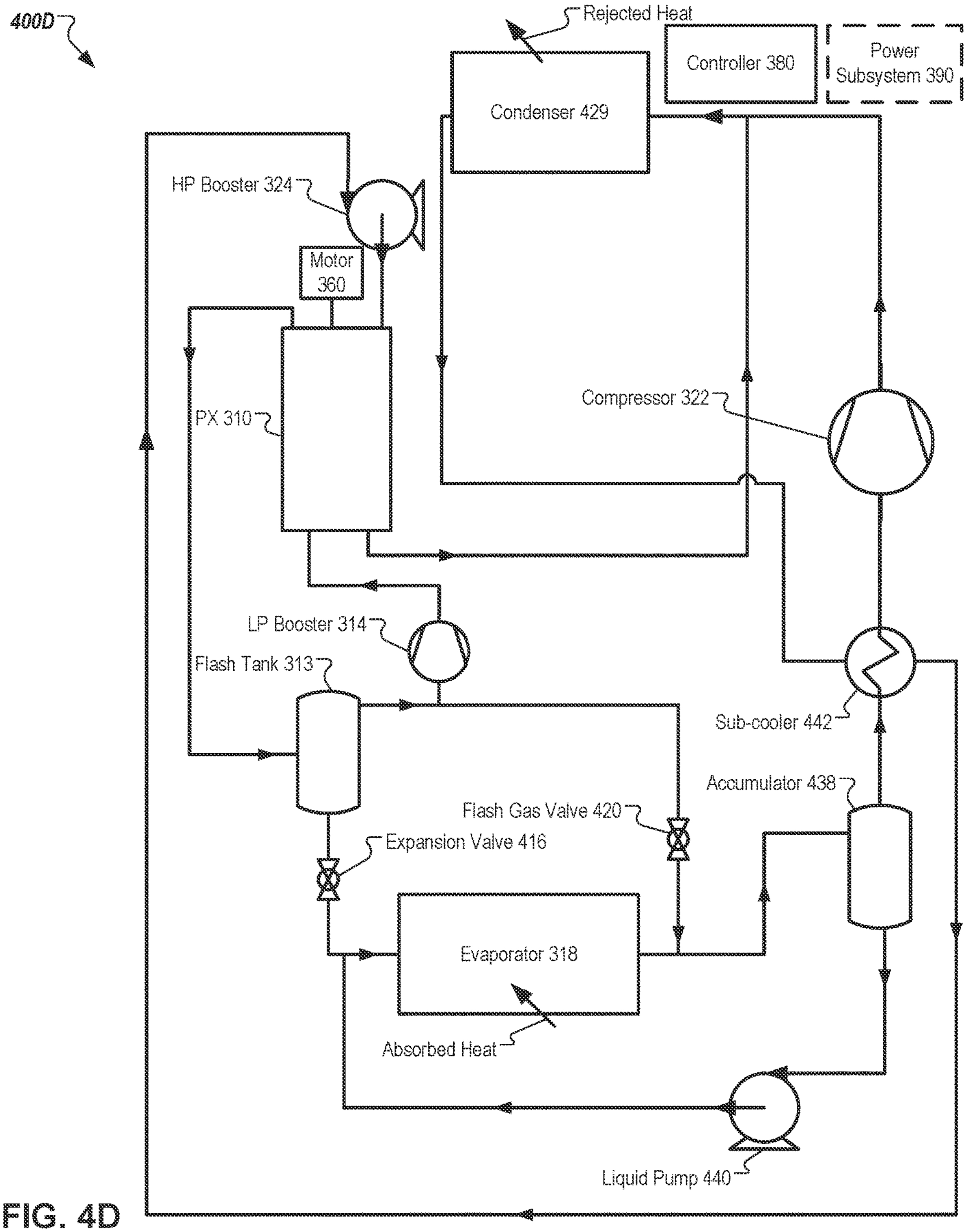

FIG. 4D is a schematic diagram of a heat pump system 400D that includes a pressure exchanger (PX) according to certain embodiments. In some embodiments, heat pump system 400D is a thermal energy transport system and/or a fluid handling system. In some embodiments, features that have reference numbers that are similar to reference numbers in other figures include similar properties, structures, and/or functionality as those described in other figures. In some examples, features of fluid handling system 400D have similar properties, structures, and/or functionality as fluid handling system 300A of FIG. 3A. In some embodiments, fluid handling system 400D includes power subsystem 390, similar to one of systems 300A-300C as depicted in FIGS. 3A-3C.

Fluid handling system 400D may include a sub-cooler 442. The sub-cooler 442 may be a heat exchanger to exchange thermal energy between two fluids. Sub-cooler 442 may receive fluid (e.g., gas) output from accumulator 438 and may also receive fluid output from the condenser 429 (e.g., may also receive first fluid output from the condenser 429). In some embodiments, the sub-cooler 442 provides corresponding thermal energy from the first fluid (e.g., fluid output from condenser 429) to gas output from the accumulator 438. The temperature of the first fluid may be reduced by flowing the first fluid from the condenser 429 through the sub-cooler 442. Flowing the first fluid through the sub-cooler 442 may cause at least some gas output from the condenser 429 to condense into liquid to be provided to the high pressure inlet of the PX 310.

Figure 5:
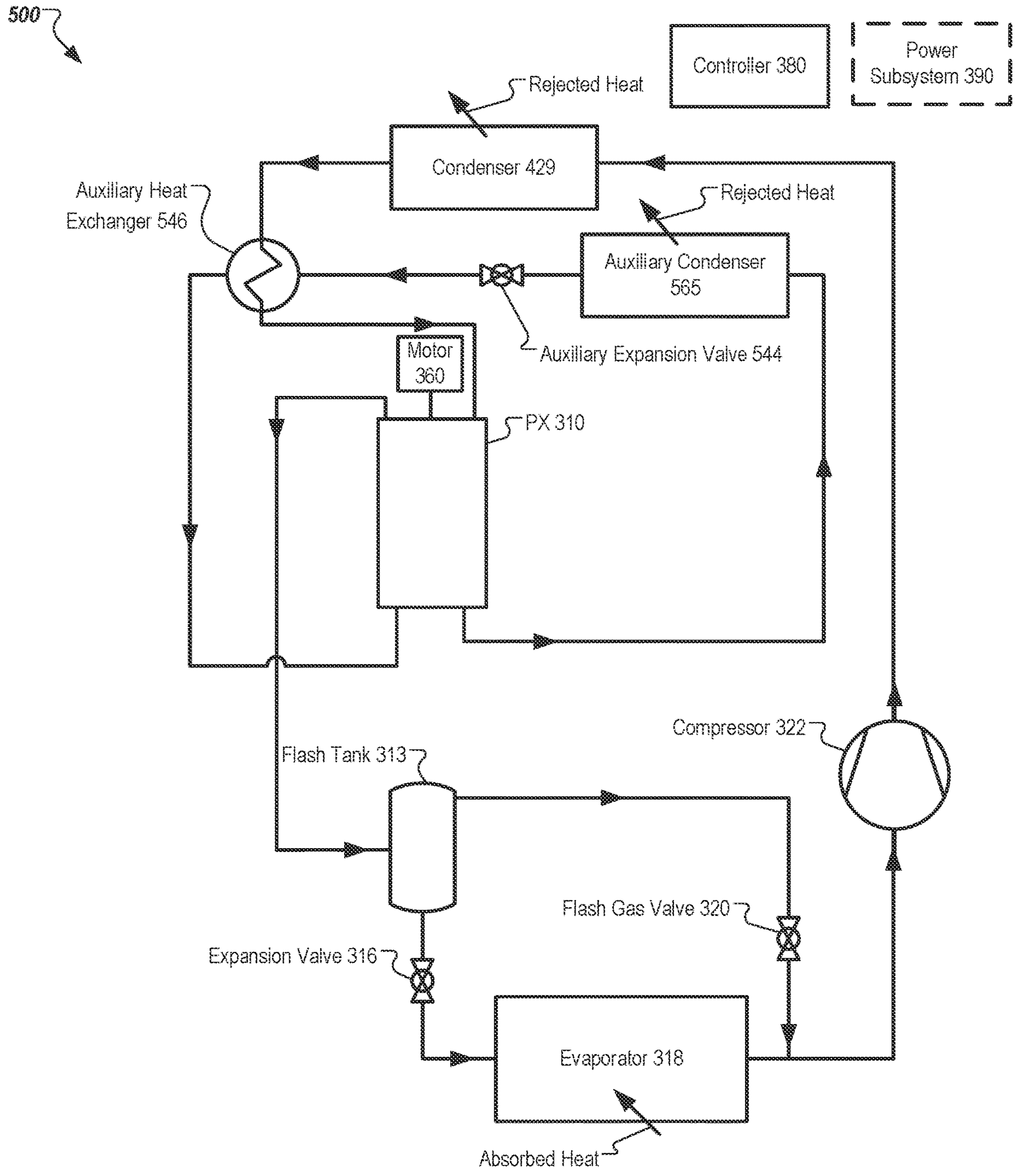
FIG. 5 is a schematic diagram of a heat pump systems including a PX and an auxiliary condenser, according to certain embodiments.

FIG. 5 is a schematic diagram of a heat pump system 500 that includes a pressure exchanger (PX) and an auxiliary condenser according to certain embodiments. In some embodiments, heat pump system 500 is a thermal energy transport system and/or a fluid handling system. In some embodiments, features that have reference numbers that are similar to reference numbers in other figures include similar properties, structures, and/or functionality as those described in other figures. In some examples, features of fluid handling system 500 have similar properties, structures, and/or functionality as fluid handling system 300A of FIG. 3A. In some embodiments, fluid handling system 500 includes power subsystem 390, similar to one of systems 300A-300C as depicted in FIGS. 3A-3C.

Fluid handling system 500 may include an auxiliary condenser 565, an auxiliary expansion valve 544, and/or an auxiliary heat exchanger 546. The auxiliary condenser 565 may be a condenser and/or a gas cooler as described herein. In some embodiments, the auxiliary condenser 565 receives the second fluid from the high pressure outlet (e.g., second outlet) of the PX 310. In some embodiments, the auxiliary condenser 565 is a heat exchanger that provides corresponding thermal energy (e.g., heat) from the second fluid to an environment. In some embodiments, the auxiliary condenser 565 exchanges thermal energy between the second fluid and the same environment with which the condenser 429 exchanges thermal energy with. In other embodiments, the auxiliary condenser 565 exchanges thermal energy between the second fluid and a different environment from which the condenser 429 exchanges thermal energy with. In some embodiments, the auxiliary condenser 565 operates across a temperature range different than condenser 429. In some embodiments, the auxiliary condenser 565 operates at a pressure different (e.g. lower) than condenser 429 The auxiliary condenser 565 operating at a lower pressure than the condenser 429 may eliminate the need for a booster (e.g., HP booster 324) to make up this differential pressure because the second fluid output from the PX 310 (e.g., at a high pressure) may be at a lower pressure than the pressure of the condenser 429.

In some embodiments, the second fluid flows from the auxiliary condenser 565 to the auxiliary expansion valve 544. Auxiliary expansion valve 544 may be an expansion valve or a flow control valve. In some embodiments, the auxiliary expansion valve 544 regulates a flow of fluid from the outlet of the auxiliary condenser 565 to the low pressure inlet (e.g., the second inlet) of the PX 310. In some embodiments, the auxiliary expansion valve 544 can be actuated to regulate the flow of fluid. The auxiliary expansion valve 544 can be actuated (e.g., opened or closed) to regulate a pressure differential of the second fluid between the high pressure outlet and the low pressure inlet of the PX 310. The second fluid may expand as the second fluid flows through the auxiliary expansion valve 544, causing a decrease in pressure of the second fluid. The decrease in pressure of the second fluid may cause a corresponding decrease in temperature of the second fluid. In some embodiments, the controller 380 may cause the auxiliary expansion valve 544 to actuate. The controller 380 may cause the auxiliary expansion valve 544 to actuate based on sensor data received from one or more sensors of fluid handling system 500.

Fluid handling system 500 may include an auxiliary heat exchanger 546. The auxiliary heat exchanger 546 may be a heat exchanger to provide corresponding thermal energy from the first fluid (e.g., output from the condenser 429) to the second fluid (e.g., output from the auxiliary expansion valve 544). Flowing the first fluid through the auxiliary heat exchanger 546 may decrease the quality of the first fluid (e.g., may increase the liquid content of the first fluid). In some embodiments, the first fluid may decrease in temperature as the first fluid exchanges thermal energy with the second fluid in the auxiliary heat exchanger 546, thus causing gas of the first fluid output by the condenser 429 to condense into liquid. Flowing the first fluid into the PX 310 in a liquid state may increase the efficiency of the PX 310.

Figure 6A:
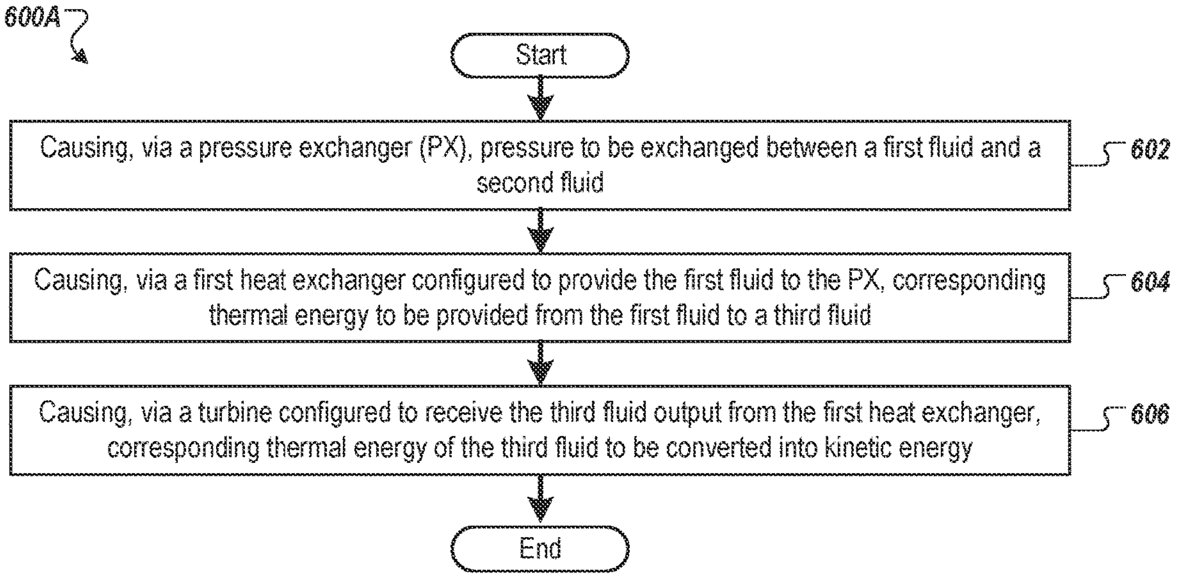
FIGS. 6A-C are flow diagrams illustrating example methods for controlling heat pump systems, according to certain embodiments.

FIG. 6A is a flow diagram illustrating a method 600A for controlling a fluid handling system (e.g., one or more of fluid handling systems 300A-C of FIGS. 3A-C), according to certain embodiments. In some embodiments, method 600A is performed by processing logic that includes hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiments, method 600A is performed, at least in part, by a controller (e.g., controller 180 of FIGS. 1A-D, controller 380 of FIGS. 3A-C). In some embodiments, a non-transitory storage medium stores instructions that when executed by a processing device (e.g., of controller 180 of FIGS. 1A-D, controller 380 of FIGS. 3A-C), cause the processing device to perform method 600A.

For simplicity of explanation, method 600A is depicted and described as a series of operations. However, operations in accordance with this disclosure can occur in various orders and/or concurrently and with other operations not presented and described herein. Furthermore, in some embodiments, not all illustrated operations are performed to implement method 600A in accordance with the disclosed subject matter. In addition, those skilled in the art will understand and appreciate that method 600A could alternatively be represented as a series of interrelated states via a state diagram or events.

At block 602, processing logic may cause pressure to be exchanged between a first fluid and a second fluid via a pressure exchanger (e.g., PX 310). In some examples, processing logic (e.g., of controller 380) may cause a pressure exchanger to operate to exchange pressure between the first fluid and the second fluid. Specifically, processing logic may cause one or more valves to open and one or more pumps and/or compressors to provide the first fluid and the second fluid to inlets of the pressure exchanger. Processing logic may cause a compressor and/or a booster (e.g., LP booster 314) to flow the first fluid and the second fluid (respectively) to the pressure exchanger based on sensor data (e.g., temperature sensor data, pressure sensor data, flowrate sensor data, etc.). The first fluid may be provided to a first inlet of the pressure exchanger at a first pressure and the second fluid may be provided to a second inlet of the pressure exchanger at a second pressure. The first pressure may be higher than the second pressure. In some embodiments (e.g., in embodiments where the pressure exchanger is a rotary pressure exchanger), processing logic may cause a motor to turn a rotor of the pressure exchanger. Providing the first and second fluids to the inlets of the pressure exchanger via the compressor and/or booster, and/or turning the pressure exchanger via a motor may cause pressure to be exchanged between the first and second fluids. The first fluid may exit the pressure exchanger via a first outlet at a third pressure and the second fluid may exit the pressure exchanger via a second outlet at a fourth pressure. The third pressure may be lower than the fourth pressure.

At block 604, processing logic may cause corresponding thermal energy to be provided from the first fluid to a third fluid via a first heat exchanger. The third fluid may be a power cycle fluid such as water or another fluid as described herein. In some examples, processing logic (e.g., of controller 380) may cause one of systems 300A-C to operate to reject heat from refrigeration fluid to power cycle fluid via gas cooler 326. The processing logic may actuate one or more valves, cause one or more pumps or compressor to operate, and/or cause a pressure exchanger to operate. Specifically, the first fluid may be caused to flow through a heat exchanger. Processing logic may cause a compressor (e.g., compressor 322) to flow fluid toward a condenser (e.g., condenser 329) based on sensor data (e.g., temperature sensor data, pressure sensor data, flowrate sensor data, etc.). The first fluid may be at a first temperature upon entering the heat exchanger and may be at a second (e.g., lower) temperature upon exiting the heat exchanger. The heat exchanger may facilitate heat transfer from the first fluid to the third fluid to reduce the temperature of the first fluid and/or to increase the temperature of the third fluid.

At block 606, processing logic may cause a turbine to convert corresponding thermal energy of the third fluid into kinetic energy. In some examples, processing logic (e.g., of controller 380) may cause power cycle fluid (e.g., third fluid) to flow through turbine 328. The processing logic may actuate one or more valves, cause one or more pumps or compressors to operate, and/or cause a pressure exchanger to operate. Processing logic may cause a power cycle compressor (e.g., power cycle compressor 334) to flow the power cycle fluid based on sensor data (e.g., temperature sensor data, pressure sensor data, flowrate sensor data, etc.). In some examples, the processing logic may cause a motor to drive the power cycle compressor (e.g., the processing logic may cause a motor coupled to the power cycle compressor to turn on). The turbine (e.g., turbine 328) may be configured to receive the power cycle fluid output from the first heat exchanger (e.g., gas cooler 326). Thermal energy of the third fluid provided to the turbine may be converted into kinetic energy (e.g., rotational kinetic energy). The turbine may in turn spin a generator (e.g., generator 330) to produce electricity. However, in some embodiments, the kinetic energy of the turbine can be used for any work or power generation. The fluid output from the turbine may be routed back to the first heat exchanger via one or more additional heat exchangers and/or a power cycle compressor (e.g., power cycle compressor 334).

Figure 6B:
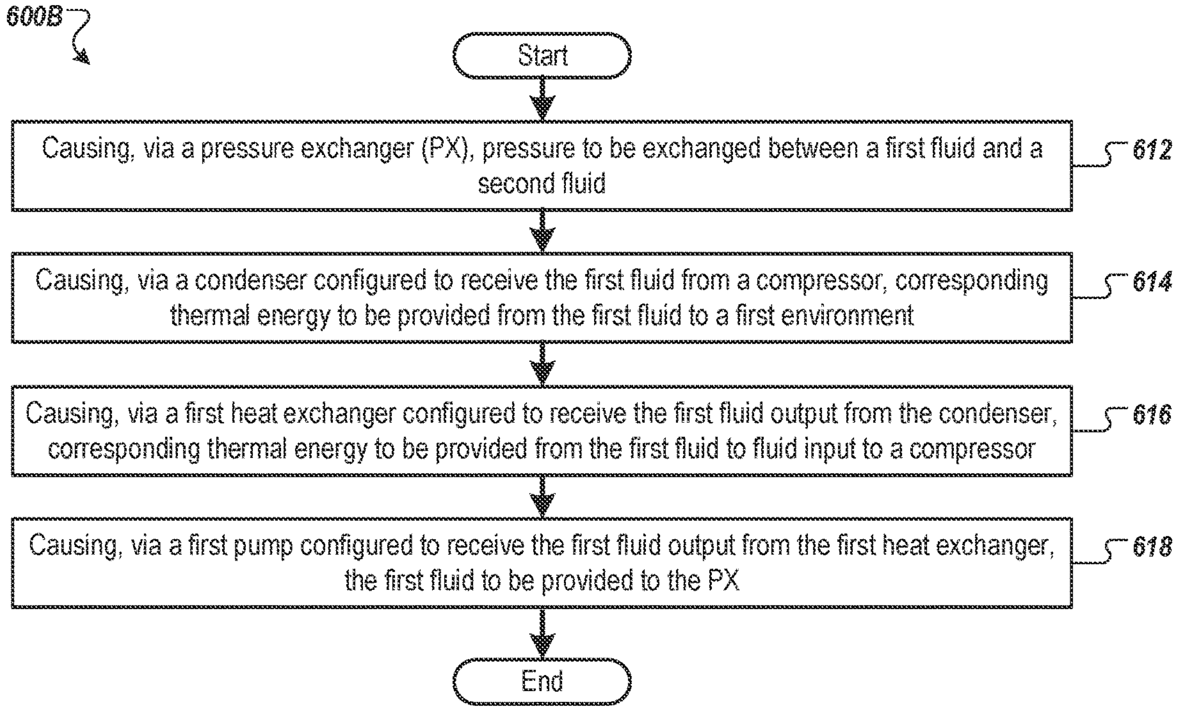

FIG. 6B is a flow diagram illustrating a method 600B for controlling a fluid handling system (e.g., fluid handling system 400D of FIG. 4D), according to certain embodiments. In some embodiments, method 600B is performed by processing logic that includes hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiments, method 600B is performed, at least in part, by a controller (e.g., controller 180 of FIGS. 1A-D, controller 380 of FIG. 4D). In some embodiments, a non-transitory storage medium stores instructions that when executed by a processing device (e.g., of controller 180 of FIGS. 1A-D, controller 380 of FIG. 4D), cause the processing device to perform method 600B.

For simplicity of explanation, method 600B is depicted and described as a series of operations. However, operations in accordance with this disclosure can occur in various orders and/or concurrently and with other operations not presented and described herein. Furthermore, in some embodiments, not all illustrated operations are performed to implement method 600B in accordance with the disclosed subject matter. In addition, those skilled in the art will understand and appreciate that method 600B could alternatively be represented as a series of interrelated states via a state diagram or events.

At block 612, processing logic may cause pressure to be exchanged between a first fluid and a second fluid via a pressure exchanger (e.g., PX 310). Block 612 may be similar to block 602 of FIG. 6A.

At block 614, processing logic may cause corresponding thermal energy to be provided from the first fluid to a first environment via a condenser. In some examples, processing logic (e.g., of controller 380) may cause system 400D to operate to reject heat from refrigeration fluid to a heated environment (e.g., an environment heated by system 400D) via condenser 429. In some embodiments, the first environment may be the interior of a building or another enclosed space. In some embodiments, thermal energy may be provided from the first fluid to a third fluid to operate a power cycle (e.g., power subsystem 390). The processing logic may actuate one or more valves, cause one or more pumps or compressor to operate, and/or cause a pressure exchanger to operate. Specifically, the first fluid may be caused to flow through a condenser. Processing logic may cause a compressor (e.g., compressor 322) to flow fluid toward a condenser (e.g., condenser 329) based on sensor data (e.g., temperature sensor data, pressure sensor data, flowrate sensor data, etc.). The first fluid may be at a first temperature upon entering the condenser and may be at a second (e.g., lower) temperature upon exiting the condenser. The condenser may facilitate heat transfer from the first fluid to the first environment to heat the first environment.

At block 616, processing logic may cause corresponding thermal energy to be provided from the first fluid to fluid input to a compressor. In some examples, processing logic (e.g., of controller 380) may cause fluid to flow through a heat exchanger (e.g., sub-cooler 442). Processing logic may actuate one or more valves, cause one or more pumps or compressor to operate, and/or cause a pressure exchanger to operate. In some embodiments, processing logic causes fluid to flow from a receiver (e.g., accumulator 438) to a compressor (e.g., compressor 322) via the heat exchanger (e.g., sub-cooler 442). Processing logic may cause a compressor (e.g., compressor 322) and/or a pump (e.g., HP booster 324) to flow fluid through the heat exchanger based on sensor data (e.g., temperature sensor data, pressure sensor data, flowrate sensor data, etc.). The processing logic may cause a motor coupled to the compressor to drive the compressor and/or may cause a motor coupled to the pump to drive the pump (e.g., the processing logic may cause the motors to turn on). The processing logic may cause corresponding thermal energy to be provided from the first fluid (e.g., the fluid output from the condenser 429) to the fluid provided to the compressor by causing the fluid to flow through the heat exchanger. The first fluid may be provided by the heat exchanger to a pump (e.g., HP booster 324).

At block 618, processing logic may cause the first fluid to be provided to the PX via the first inlet of the PX (e.g., via a pump). In some examples, processing logic (e.g., of controller 380) may cause a pump (e.g., HP booster 324) to increase pressure of the first fluid output from the first heat exchanger (e.g., sub-cooler 442). Processing logic may cause a motor to drive the pump to increase the pressure of the first fluid based on sensor data (e.g., temperature sensor data, pressure sensor data, flowrate sensor data, etc.). In some embodiments, the pump may be a centrifugal pump or a positive displacement pump.

Figure 6C:
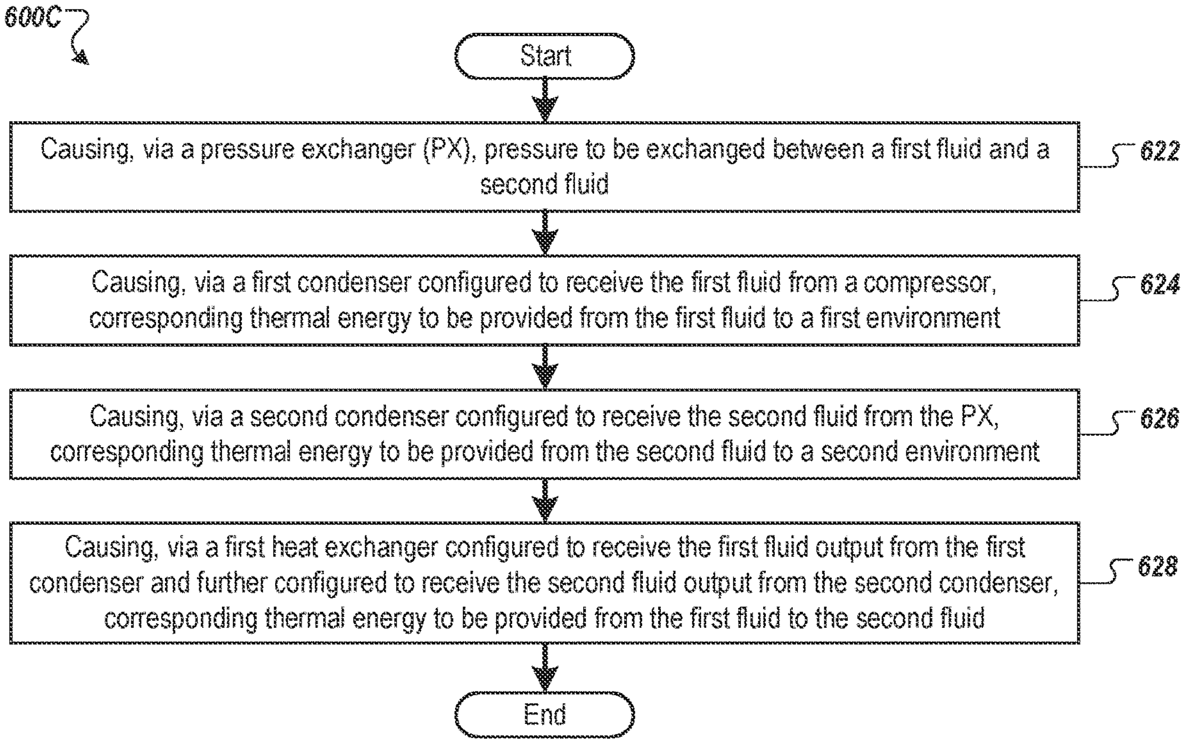

FIG. 6C is a flow diagram illustrating a method 600C for controlling a fluid handling system (e.g., fluid handling system 500 of FIG. 5), according to certain embodiments. In some embodiments, method 600C is performed by processing logic that includes hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiments, method 600C is performed, at least in part, by a controller (e.g., controller 180 of FIGS. 1A-D, controller 380 of FIG. 5). In some embodiments, a non-transitory storage medium stores instructions that when executed by a processing device (e.g., of controller 180 of FIGS. 1A-D, controller 380 of FIG. 5), cause the processing device to perform method 600C.

For simplicity of explanation, method 600C is depicted and described as a series of operations. However, operations in accordance with this disclosure can occur in various orders and/or concurrently and with other operations not presented and described herein. Furthermore, in some embodiments, not all illustrated operations are performed to implement method 600C in accordance with the disclosed subject matter. In addition, those skilled in the art will understand and appreciate that method 600C could alternatively be represented as a series of interrelated states via a state diagram or events.

At block 622, processing logic may cause pressure to be exchanged between a first fluid and a second fluid via a pressure exchanger (e.g., PX 310). Block 622 may be similar to block 602 of FIG. 6A.

At block 624, processing logic may cause corresponding thermal energy to be provided from the first fluid to a first environment via a first condenser. In some examples, processing logic (e.g., of controller 380) may cause system 400D to operate to reject heat from refrigeration fluid to a heated environment (e.g., an environment heated by system 400D) via condenser 429. The condenser may be configured to receive the first fluid output from a compressor (e.g., compressor 322).

At block 626, processing logic may cause corresponding thermal energy to be provided from the second fluid to a second environment via a second condenser (e.g., auxiliary condenser 565). In some examples, processing logic may cause the second fluid to flow from the pressure exchanger (e.g., PX 310) to the second condenser. The processing logic may cause the second fluid to flow by causing the pressure exchange between the first fluid and the second fluid inside the pressure exchanger based on sensor data (e.g., temperature sensor data, pressure sensor data, flowrate sensor data, etc.). The second condenser may facilitate heat transfer from the second fluid to the second environment. In some embodiments, the second environment is a heated space (e.g., heated by system 500). In some embodiments, the second environment is the same environment as the first environment. In some embodiments, processing logic may cause the corresponding thermal energy to be provided from the second fluid to a third fluid used in a power cycle (e.g., power subsystem 390).

At block 628, processing logic may cause corresponding thermal energy to be provided from the first fluid to the second fluid via a first heat exchanger (e.g., auxiliary heat exchanger 546). In some examples, processing logic may cause the first heat exchanger to receive the first fluid output from the first condenser and the second fluid output from the second condenser. The first heat exchanger may facilitate an exchange of heat (e.g., thermal energy) from the first fluid to the second fluid. The processing logic may actuate one or more valves, cause one or more pumps or compressor to operate, and/or cause a pressure exchanger to operate. Specifically, the first fluid may be caused to flow from the first condenser to the first inlet of the pressure exchanger via the first heat exchanger, and the second fluid may be caused to flow from the second condenser to the second inlet of the pressure exchanger. Processing logic may cause a compressor (e.g., compressor 322) to flow the first fluid through the first heat exchanger (e.g., by causing a motor coupled to the compressor to drive the compressor) based on sensor data (e.g., temperature sensor data, pressure sensor data, flowrate sensor data, etc.). Processing logic may cause the second fluid to flow through the first heat exchanger by exchanging pressure between the first fluid and the second fluid in the pressure exchanger (e.g., raising pressure of the second fluid). Thermal energy may be transferred from the first fluid to the second fluid via the first heat exchanger. In some embodiments, the quality of the first fluid (e.g., the vapor content of the first fluid) may be decreased by the thermal energy exchange in the first heat exchanger.

Figure 7:
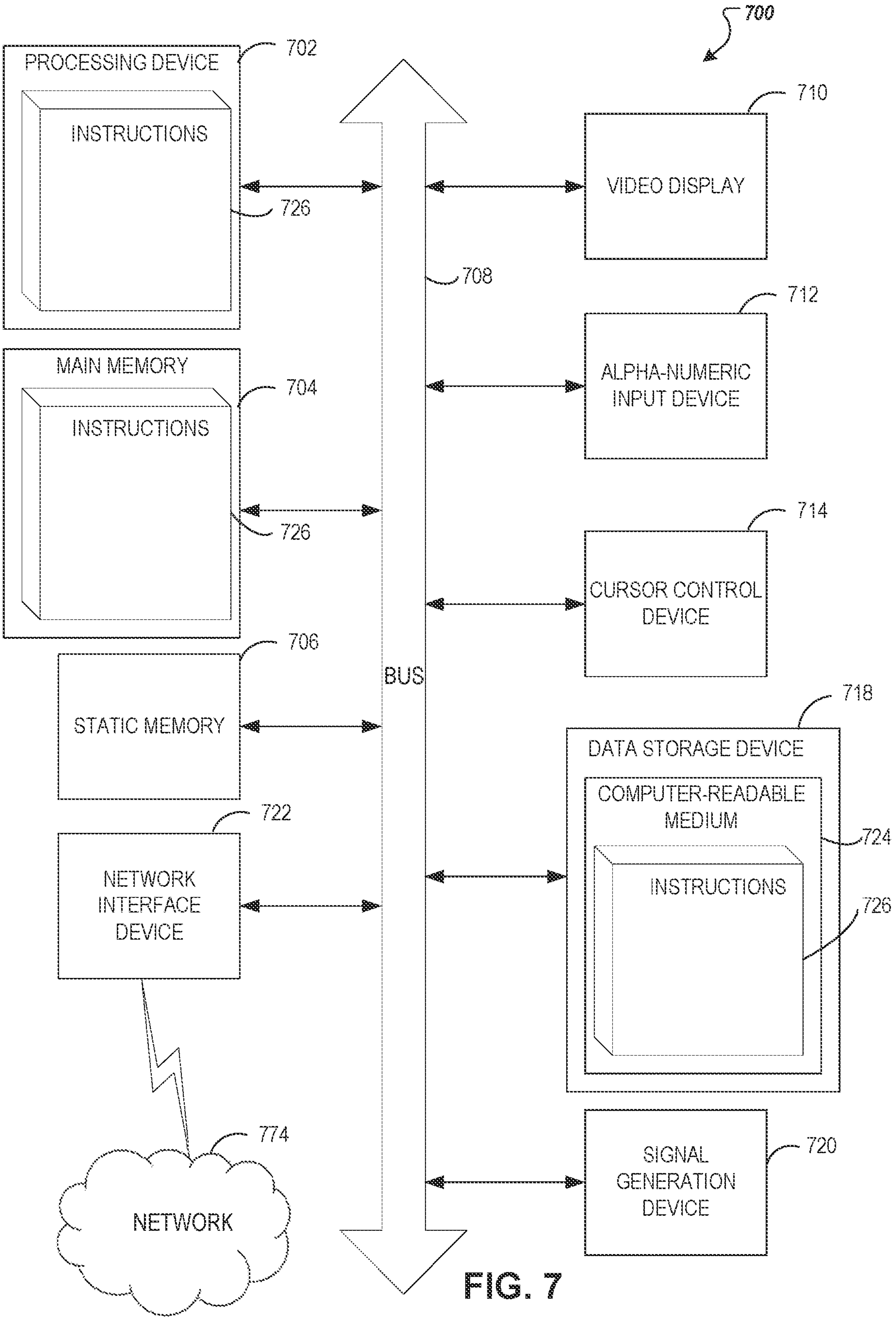
FIG. 7 is a block diagram illustrating a computer system, according to certain embodiments

FIG. 7 is a block diagram illustrating a computer system 700, according to certain embodiments. In some embodiments, the computer system 700 is a client device. In some embodiments, the computer system 700 is a controller device (e.g., server, controller 180 of FIGS. 1A-D, controller 380 of FIGS. 3A-C, 4A-D, and 5).

In some embodiments, computer system 700 is connected (e.g., via a network, such as a Local Area Network (LAN), an intranet, an extranet, or the Internet) to other computer systems. Computer system 700 operates in the capacity of a server or a client computer in a client-server environment, or as a peer computer in a peer-to-peer or distributed network environment. In some embodiments, computer system 700 is provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In some embodiments, the computer system 700 includes a processing device 702, a volatile memory 704 (e.g., Random Access Memory (RAM)), a non-volatile memory 706 (e.g., Read-Only Memory (ROM) or Electrically-Erasable Programmable ROM (EEPROM)), and/or a data storage device 716, which communicates with each other via a bus 708.

In some embodiments, processing device 702 is provided by one or more processors such as a general purpose processor (such as, in some examples, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, in some examples, an Application Specific Integrated Circuit (ASIC), a Field Programmable Gate Array (FPGA), a Digital Signal Processor (DSP), or a network processor). In some embodiments, processing device 702 is provided by one or more of a single processor, multiple processors, a single processor having multiple processing cores, and/or the like.

In some embodiments, computer system 700 further includes a network interface device 722 (e.g., coupled to network 774). In some embodiments, the computer system 700 includes one or more input/output (I/O) devices. In some embodiments, computer system 700 also includes a video display unit 710 (e.g., a liquid crystal display (LCD)), an alphanumeric input device 712 (e.g., a keyboard), a cursor control device 714 (e.g., a mouse), and/or a signal generation device 720.

In some implementations, data storage device 718 (e.g., disk drive storage, fixed and/or removable storage devices, fixed disk drive, removable memory card, optical storage, network attached storage (NAS), and/or storage area-network (SAN)) includes a non-transitory computer-readable storage medium 724 on which stores instructions 726 encoding any one or more of the methods or functions described herein, and for implementing methods described herein.

In some embodiments, instructions 726 also reside, completely or partially, within volatile memory 704 and/or within processing device 702 during execution thereof by computer system 700, hence, volatile memory 704 and processing device 702 also constitute machine-readable storage media, in some embodiments.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "actuating," "adjusting," "causing," "controlling," "determining," "exchanging," "identifying," "providing," "receiving," "regulating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods described herein and/or each of their individual functions, routines, subroutines, or operations. Examples of the structure for a variety of these systems are set forth in the description above.

The preceding description sets forth numerous specific details, such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about," "substantially," or "approximately" is used herein, this is intended to mean that the nominal value presented is precise within ±10%. Also, the terms "first," "second," "third," "fourth," etc. as used herein are meant as labels to distinguish among different elements and can not necessarily have an ordinal meaning according to their numerical designation.

The terms "over," "under," "between," "disposed on," and "on" as used herein refer to a relative position of one material layer or component with respect to other layers or components. In some examples, one layer disposed on, over, or under another layer may be directly in contact with the other layer or may have one or more intervening layers. Moreover, one layer disposed between two layers may be directly in contact with the two layers or may have one or more intervening layers. Similarly, unless explicitly stated otherwise, one feature disposed between two features may be in direct contact with the adjacent features or may have one or more intervening layers.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner. In one embodiment, multiple metal bonding operations are performed as a single step.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which each claim is entitled.

What is claimed is:

1. A system comprising:

a pressure exchanger (PX) configured to receive a first fluid at a first pressure via a first inlet of the PX, receive a second fluid at a second pressure via a second inlet of the PX, and exchange pressure between the first fluid and the second fluid, wherein the first fluid is to exit the PX at a third pressure via a first outlet of the PX, and wherein the second fluid is to exit the PX at a fourth pressure via a second outlet of the PX;

a first condenser configured to receive the first fluid from a compressor and provide corresponding thermal energy from the first fluid to a first environment;

a second condenser configured to receive the second fluid from the PX via the second outlet and provide corresponding thermal energy from the second fluid to a second environment; and a first heat exchanger configured to receive first fluid output from the first condenser and further configured to receive second fluid output from the second condenser, wherein the first heat exchanger is configured to provide corresponding thermal energy from the first fluid to the second fluid and provide the first fluid to the PX via the first inlet.

2. The system of claim 1, further comprising:

a receiver configured to receive first fluid from the first outlet of the PX, wherein the receiver forms a chamber configured to separate the first fluid into a first gas and a first liquid.

3. The system of claim 2, further comprising a bypass valve configured to:

receive a portion of the first gas of the first fluid from the receiver;

decrease pressure of the portion of the first gas; and provide the portion of the first gas to be combined with output of an evaporator.

4. The system of claim 1, further comprising:

an evaporator configured to provide corresponding thermal energy from a third corresponding environment to at least a portion of first fluid output from the first outlet of the PX.

5. The system of claim 4, wherein the compressor is configured to receive the at least a portion of the first fluid output from the evaporator, increase a corresponding pressure of the at least a portion of the first fluid, and provide the at least a portion of the first fluid to the first condenser.

6. The system of claim 1, wherein the system is one or more of a refrigeration system or a heat pump system, wherein the first fluid and the second fluid comprise carbon dioxide ($CO_2$).

7. The system of claim 1, wherein the first pressure is higher than the second pressure, and wherein the third pressure is lower than the fourth pressure.

8. A method, comprising:

causing, via a pressure exchanger (PX), pressure to be exchanged between a first fluid and a second fluid;

causing, via a first condenser configured to receive the first fluid from a compressor, corresponding thermal energy to be provided from the first fluid to a first environment;

causing, via a second condenser configured to receive the second fluid from the PX, corresponding thermal energy to be provided from the second fluid to a second environment; and causing, via a first heat exchanger configured to receive first fluid output from the first condenser and further configured to receive second fluid output from the second condenser, corresponding thermal energy to be provided from the first fluid to the second fluid.

9. The method of claim 8, further comprising:

causing, via a receiver configured to receive first fluid output from the PX, the first fluid to separate into a first gas and a first liquid.

10. The method of claim 9, further comprising:

causing, via a bypass valve configured to receive a portion of the first gas from the receiver, a pressure decrease of the portion of the first gas and to provide the portion of the first gas to be combined with output of an evaporator.

11. The method of claim 8, further comprising:

causing, via an evaporator, corresponding thermal energy to be provided from a third corresponding environment to at least a portion of first fluid output from a first outlet of the PX.

12. The method of claim 11, further comprising:

causing, via the compressor, an increase in corresponding pressure of the at least a portion of the first fluid and provide the at least a portion of the first fluid to the first condenser.

13. The method of claim 8, wherein the PX is to receive the first fluid at a first pressure via a first inlet of the PX and the PX is to receive the second fluid at a second pressure via a second inlet of the PX, wherein the first fluid is to exit the PX at a third pressure via a first outlet of the PX, and wherein the second fluid is to exit the PX at a fourth pressure via a second outlet of the PX.

14. The method of claim 13, wherein the first pressure is higher than the second pressure, and wherein the third pressure is lower than the fourth pressure.

15. A non-transitory computer-readable storage medium comprising instructions that, when executed by a processing device, cause the processing device to perform operations comprising:

causing, via a pressure exchanger (PX), pressure to be exchanged between a first fluid and a second fluid;

causing, via a first condenser configured to receive the first fluid from a compressor, corresponding thermal energy to be provided from the first fluid to a first environment;

causing, via a second condenser configured to receive the second fluid from the PX, corresponding thermal energy to be provided from the second fluid to a second environment; and causing, via a first heat exchanger configured to receive first fluid output from the first condenser and further configured to receive second fluid output from the second condenser, corresponding thermal energy to be provided from the first fluid to the second fluid.

16. The non-transitory computer-readable storage medium of claim 15, wherein the operations further comprise:

causing, via a receiver configured to receive first fluid output from the PX, the first fluid to separate into a first gas and a first liquid.

17. The non-transitory computer-readable storage medium of claim 16, wherein the operations further comprise:

causing, via a bypass valve configured to receive a portion of the first gas from the receiver, a pressure decrease of the portion of the first gas and to provide the portion of the first gas to be combined with output of an evaporator.

18. The non-transitory computer-readable storage medium of claim 15, wherein the operations further comprise:

causing, via an evaporator, corresponding thermal energy to be provided from a third corresponding environment to at least a portion of first fluid output from a first outlet of the PX; and causing, via the compressor, an increase in corresponding pressure of the at least a portion of the first fluid and provide the at least a portion of the first fluid to the first condenser.

19. The non-transitory computer-readable storage medium of claim 15, wherein the PX is to receive the first fluid at a first pressure via a first inlet of the PX and the PX is to receive the second fluid at a second pressure via a second inlet of the PX, wherein the first fluid is to exit the PX at a third pressure via a first outlet of the PX, and wherein the second fluid is to exit the PX at a fourth pressure via a second outlet of the PX.

20. The non-transitory computer-readable storage medium of claim 19, wherein the first pressure is higher than the second pressure, and wherein the third pressure is lower than the fourth pressure.

* * * * *